(12) United States Patent
Hara et al.

(10) Patent No.: US 7,444,400 B2
(45) Date of Patent: Oct. 28, 2008

(54) REMOTE SITE MANAGEMENT SYSTEM

(75) Inventors: Hiroyuki Hara, Kanagawa (JP);
Ryoichiro Sato, Kanagawa (JP);
Shinichi Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 774 days.

(21) Appl. No.: 09/947,531

(22) Filed: Sep. 7, 2001

(65) Prior Publication Data
US 2002/0059410 A1    May 16, 2002

(30) Foreign Application Priority Data
Sep. 12, 2000   (JP)   ............................. 2000-277246
Aug. 21, 2001   (JP)   ............................. 2001-250413

(51) Int. Cl.
    *G06F 15/173*   (2006.01)
(52) U.S. Cl. ........................................ 709/224; 709/223
(58) Field of Classification Search ................ 709/200, 709/203, 217, 218, 219, 223, 224
    See application file for complete search history.

(56) References Cited

U.S. PATENT DOCUMENTS

| | | | | |
|---|---|---|---|---|
| 5,079,765 A | * | 1/1992 | Nakamura | 370/401 |
| 5,537,626 A | * | 7/1996 | Kraslavsky et al. | 710/8 |
| 5,715,394 A | * | 2/1998 | Jabs | 709/223 |
| 5,742,762 A | * | 4/1998 | Scholl et al. | 709/200 |
| 5,790,797 A | * | 8/1998 | Shimada et al. | 709/224 |
| 5,862,404 A | * | 1/1999 | Onaga | 710/8 |
| 6,085,243 A | * | 7/2000 | Fletcher et al. | 709/224 |
| 6,131,112 A | * | 10/2000 | Lewis et al. | 709/207 |
| 6,145,001 A | * | 11/2000 | Scholl et al. | 709/223 |
| 6,363,421 B2 | * | 3/2002 | Barker et al. | 709/223 |
| 6,418,469 B1 | * | 7/2002 | Justice et al. | 709/224 |
| 6,453,268 B1 | * | 9/2002 | Carney et al. | 702/186 |
| 6,519,048 B1 | * | 2/2003 | Tanaka | 358/1.13 |

(Continued)

FOREIGN PATENT DOCUMENTS

JP    05-143377    6/1993

(Continued)

OTHER PUBLICATIONS

M. Jander, "Management Frameworks, Moving Toward A Unified View Of Distributed Networks", Data Communications, McGraw Hill, New York, vol. 23, No. 3, Feb. 1, 1994, pp. 58-66, 68.

*Primary Examiner*—Glenton B Burgess
*Assistant Examiner*—Aaron Strange
(74) *Attorney, Agent, or Firm*—Fitzpatrick, Cella, Harper & Scinto

(57) ABSTRACT

In order to integrally manage computers and peripheral devices at a user site, when a device monitoring server (203a) receives a trouble message from a device, it sends a message indicating this to a device center server (210) via a router (204). If the received message is a trouble message, the device center server (210) controls an event adapter to convert the received message into a format that a center server can process, and transfers the converted message to the center server (110). Upon receiving the message, the center server (110) displays occurrence of a trouble in an event list using an event monitor (110a). The user can simultaneously monitor the versatile computers and peripheral devices by observing the event monitor.

7 Claims, 19 Drawing Sheets

U.S. PATENT DOCUMENTS

| | | | |
|---|---|---|---|
| 6,694,376 B1 * | 2/2004 | Ohara | 709/250 |
| 6,832,247 B1 * | 12/2004 | Cochran et al. | 709/223 |
| 6,862,619 B1 * | 3/2005 | Sugauchi et al. | 709/224 |
| 7,017,071 B2 * | 3/2006 | Katayama et al. | 714/4 |
| 7,275,101 B2 * | 9/2007 | Katayama et al. | 709/224 |
| 7,287,073 B2 * | 10/2007 | Katayama et al. | 709/224 |
| 2002/0091815 A1 * | 7/2002 | Anderson et al. | 709/223 |

FOREIGN PATENT DOCUMENTS

| | | |
|---|---|---|
| JP | 08-016500 | 1/1996 |
| JP | 09-055737 | 2/1997 |
| JP | 11-275088 | 10/1999 |
| JP | 2000-112847 | 4/2000 |
| WO | WO 97/44937 | 11/1997 |

* cited by examiner

FIG. 8

| FIELD | LENGTH (BYTE) | PURPOSE |
|---|---|---|
| TAG | | |
| FLAG | 1 | VARIOUS KINDS OF INFORMATION ARE REPRESENTED BY BITS.<br>BIT CONTENTS ARE AS FOLLOWS.<br>XXX.....: INDICATE COMMUNICATION MEANS<br>    B' 100' = TCP/IP<br>    B' 010' = DIAL-UP<br>    B' 001' = E-MAIL<br>.......X: INDICATE IF DATA CONTINUES<br>    B' 0' = SIMPLE DATA OR FINAL DATA<br>    B' 1' = PRESENCE OF CONTINUOUS DATA<br>OTHER BITS ARE SPARE BITS |
| DATA TYPE | 1 | INDICATE TYPE OF DATA<br>  X' 01' : AUTHENTICATION REQUEST DATA<br>  X' 02' : PARAMETER SETUP REQUEST DATA<br>  X' 04' : DEVICE INFORMATION ACQUISITION<br>          REQUEST DATA<br>  X' 08' : EVENT INFORMATION MESSAGE DATA<br>  X' 10' : RESPONSE DATA<br>  X' 80' : DISCONNECTION REQUEST DATA |
| JOB ID | 1 | DISCRIMINATE SEQUENCE<br>SINGLE JOB ID MUST BE ASSIGNED IN SESSION<br>  X' 00' : PARAMETER SETUP<br>  X' 01' : DEVICE INFORMATION ACQUISITION<br>  X' 02' : EVENT INFORMATION MESSAGE |
| RETURN VALUE | 1 | INDICATE RETURN VALUE WHEN DATA TYPE IS RESPONSE DATA (X' 10').<br>INDICATE DISCONNECTION REASON WHEN DATA TYPE IS DISCONNECTION REQUEST DATA (X' 80').<br>X' 00' IS SET WHEN DATA TYPE IS OTHER THAN RESPONSE DATA (X' 10') AND DISCONNECTION REQUEST DATA (X' 80') |
| DATA LENGTH | 4 | INDICATE DATA LENGTH BY NUMBER OF BYTES (NETWORK BYTE ORDER) |
| DATA | VARIABLE LENGTH | DATA |

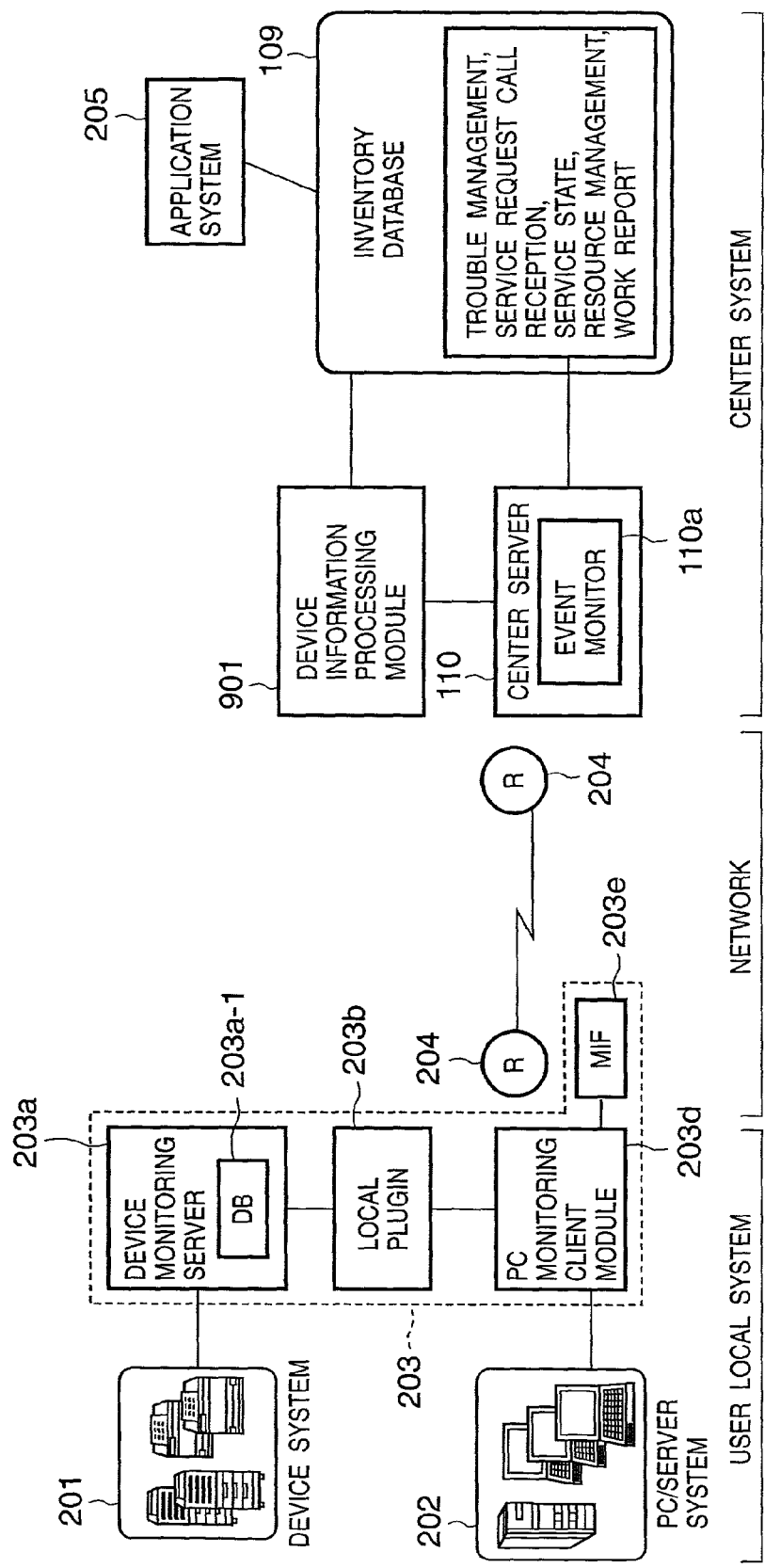

REMOTE SITE MANAGEMENT SYSTEM

FIELD OF THE INVENTION

The present invention relates to a remote site management system for systematically monitoring states of office equipments connected via a computer network, e.g., states of PC/server-system equipments including computers such as a versatile PC, server, and the like, and peripheral device-system equipments specialized to dedicated functions, especially, input/output functions such as a printer, copying machine, scanner, and the like from remote places.

BACKGROUND OF THE INVENTION

A conventional monitoring/management system that simply collects log information such as operation information, error information, and the like associated with a given apparatus in an office is present. Also, a system for collecting information collected in the office in a center server equipped/connected outside the office via a network, and monitoring/managing the collected information is present. However, such management/monitoring systems monitor/manage only a PC/server system, i.e., versatile computers, or only a device system such as a printer, copying machine, and the like.

The reason why versatile computers and devices are independently managed is that sequences and the like for managing them are different from each other. That is, a versatile computer can be managed by creating a program that provides a required function in accordance with an environment such as its operating system or the like, and running it on the computer to be managed. However, since it is nearly impossible to add or change functions of peripheral devices in practice, and there are no standards in information required upon management such as data formats to be exchanged with peripheral devices, exchange sequences, and the like, a corresponding management sequence must be developed for each peripheral device, and individual peripheral devices are connected to corresponding management sites and are managed. In this manner, a device management system is alien to a versatile computer management system, and the two systems are present independently.

For this reason, these two systems must be equipped to monitor both the PC/server system and device system, and the system scale increases, resulting in complicated management, and expensive systems and high maintenance cost. Since independent systems must be used, a user site and supervisor site must be connected via different lines.

Furthermore, when the two systems are equipped, a supervisor must monitor office equipments via the two management systems, resulting in very troublesome operations.

SUMMARY OF THE INVENTION

The present invention has been made in consideration of the aforementioned problems, and has as its first object to provide a remote site management system which allows a supervisor to integrally manage both versatile computers and peripheral devices at remote sites.

It is the second object of the present invention to provide a remote site management system which can also manage information unique to each peripheral device, i.e., detailed information of each peripheral device upon integrally managing versatile computers and peripheral devices.

It is the third object of the present invention to provide a remote site management system which integrally manages versatile computers and peripheral devices, and can be developed efficiently.

It is the fourth object of the present invention to provide a remote site management system which can also integrate a communication line of both versatile computers and peripheral devices.

It is the fifth object of the present invention to provide a remote site management system which also allows a user to integrate management of versatile computers and peripheral devices.

In order to achieve the above objects, the present invention comprises the following arrangement.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flow chart showing the processing sequence for events generated in a device monitoring server 203a;

FIG. 8 shows an example of the message format exchanged between the device center server 210 and device monitoring server 203a;

FIG. 9 is a block diagram showing the arrangement of software modules of a remote site management system of this embodiment;

DETAILED DESCRIPTION OF THE PREFERRED EMBODIMENTS

First Embodiment

An office equipment monitoring system as the first embodiment of the present invention will be described below with reference to the accompanying drawings.

<System Arrangement>

Figure 1:
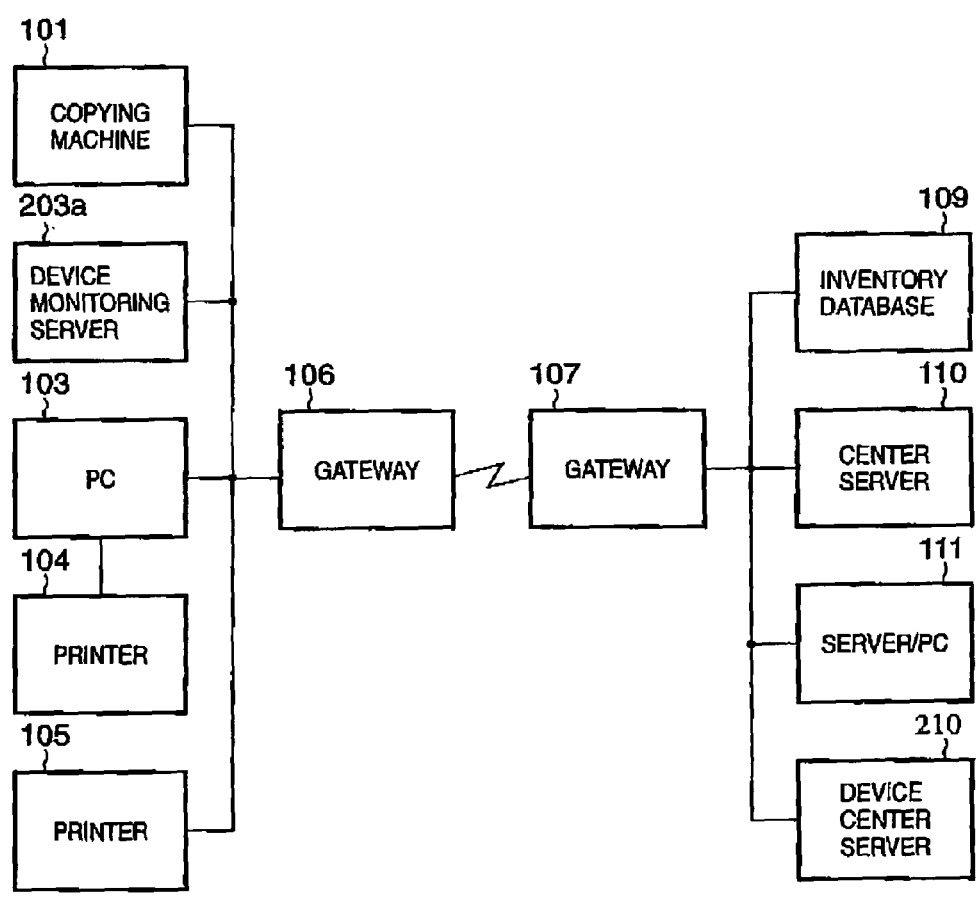
FIG. 1 is a block diagram showing the arrangement of a user site and supervisor site.

FIG. 1 is a block diagram showing the arrangement of a user site and supervisor site. The user site includes a PC 103 and device monitoring server 203a (information apparatus for managing devices connected to a local network of, e.g., an office) as versatile computers, and copying machine 101 and printers 105 and 104 as peripheral devices, which are connected via a LAN. Note that the versatile computers include a personal computer, server, gateway, router, and network itself, and peripheral devices include a copying machine, printer, scanner, FAX, multi-function machine, and the like. The PC 103 can execute a PC monitoring client module for managing versatile computers (to be described later), and serves as a PC monitoring client that can manage versatile computers connected to the local network of, e.g., an office. The device monitoring server 203a and PC monitoring client server may be physically independent apparatuses or a single apparatus, and the objects of the present invention can be achieved as long as they are logically independent and their functions are implemented.

Although not shown in FIG. 1, a converter or the like for converting/adjusting the data format between the device monitoring server 203a and PC monitoring client module (PC monitoring client) is connected to the LAN of the user site as another building component of the present invention.

In the supervisor site, a LAN system is constituted by connecting a center server 110 for integrally managing devices of the user site, an inventory database 109 for storing management information and the like, and a device center server 210 for exclusively managing peripheral devices in the user site. To this system, another computer such as a server/PC 111 may be connected, and an application program for management using management information may be executed by this computer 111.

Although not shown in FIG. 1, the supervisor site also includes a display device for displaying information sent from the user site, a converter for converting/adjusting the data format between the center server 110 and device center server, and the like as the building components of the present invention.

Also, a service center (corresponding to an application system 205 in FIG. 2) for systematically managing the supervisor site may be connected to the supervisor site via an external network or LAN.

These user site and supervisor site are connected to each other via gateways 106 and 107. This connection may be established using a versatile router, modem, or the like. When the PC 103 executes the PC monitoring client module, connection between the PC 103 and center server 110, and connection between the device monitoring server 203a and device center server 210 may be independently established.

Figure 3:
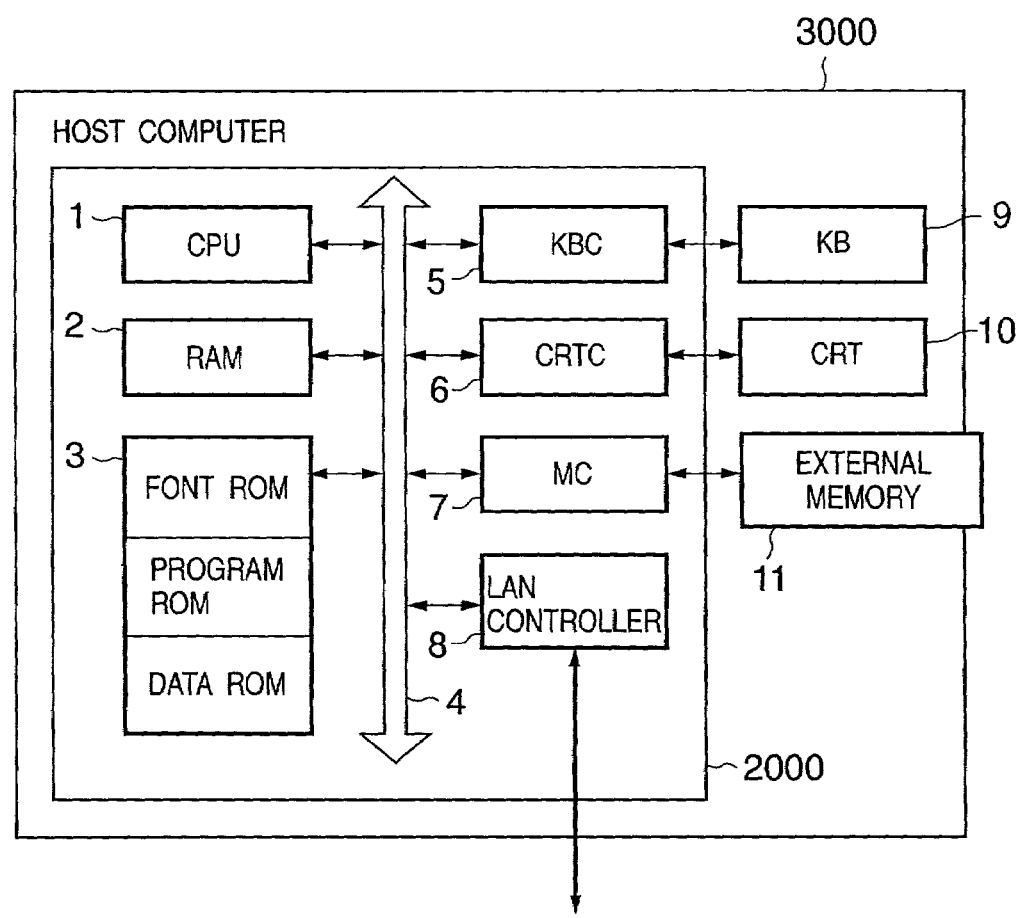
FIG. 3 is a block diagram showing the arrangement of a computer as a PC and server.

FIG. 3 is a block diagram showing the arrangement of the computer as the PC and server. Referring to FIG. 3, a computer 3000 comprises a CPU 1 for executing sequences for controlling transmission of designated data to an external apparatus or data reception from an external apparatus on the basis of communication control programs with sequences to be described later, and the like, and systematically controls devices connected to a system bus 4. A RAM 2 serves as a main memory, work area, and the like of the CPU 1. A keyboard controller (KBC) 5 controls key input from a keyboard 9 and a pointing device (not shown). A CRT controller (CRTC) 6 controls display on a CRT display 10. A memory controller (MC) 7 controls accesses to an external memory 11 such as a hard disk (HD), floppy disk (FD), or the like, which stores a boot program, various application programs, font data, user files, edit files (to be described later), and the like. A LAN controller 8 is connected to a network, and executes a communication control process with other devices connected to the network.

Figure 2:
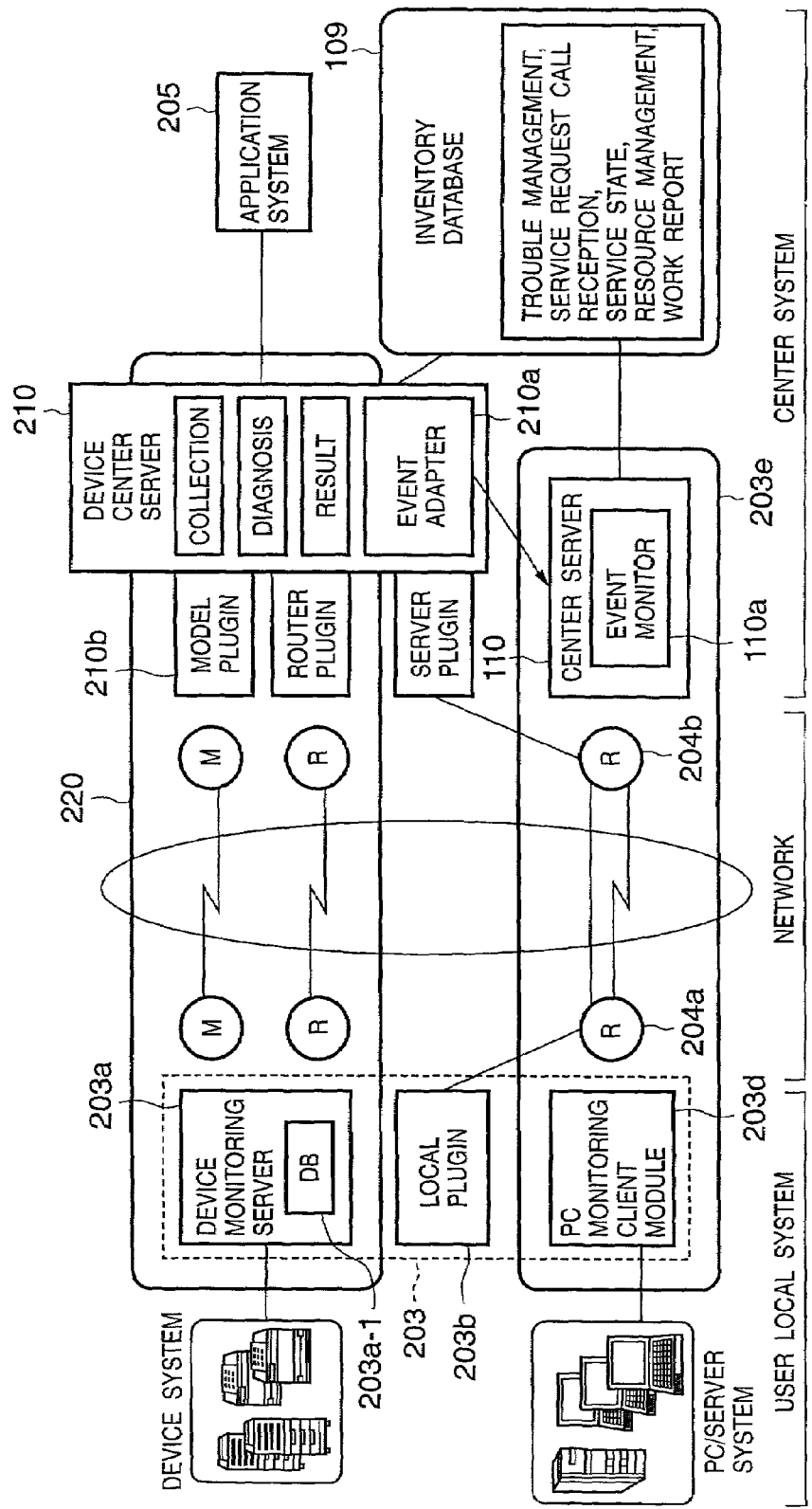
FIG. 2 is a block diagram showing the arrangement of software modules of a remote site management system of the present invention.

FIG. 2 is a block diagram showing the arrangement of principal software modules of the office equipment management system of the present invention. A user local system (corresponding to the user site) includes both device-system equipments (peripheral devices such as a copying machine, printer, multi-function machine, scanner, FAX, and the like), and PC/server-system equipments (versatile computers). The device-system equipments and PC/server-system equipments are respectively locally managed by the device monitoring server 203a which implements a device monitoring module and a PC monitoring client 203d which implements a PC monitoring module. These server and client will be generally called a local management system 203. The device monitoring server 203a has a database 203a-1 for storing management information.

On the other hand, a center system (corresponding to the supervisor site) includes the device center server 210 for exchanging data with the device monitoring server 203a, and the center server 110 for exchanging data with the PC monitoring client 203d. Note that the inventory database 109 stores management information of the device-system equipments collected from the user local system. Also, the inventory database 109 stores management information which is managed by the center server and pertains to the PC/server-system equipments. These pieces of management information stored in the inventory database 109 are used by an application system 205 and the like. Note that the objects of the present invention can be achieved as long as the inventory database 109 allows to logically independently process information of the device system and versatile computer system such as the PC/server and the like. Of course, the inventory database 109 may be physically separated.

The device monitoring server 203a and device center server 210 are connected via a local plugin module 203b and server plugin module for converting the data format and protocol as needed. These local and center plugin modules allow communications between the local and center sides even when the two sides use different OSs. Electrically, the servers are connected via routers 204. This line is physically or logically shared by a line for connecting the PC monitoring client 203d and center server 110.

The line for connecting the device center server 210 and device monitoring server 203a may not be shared by the line for connecting the monitoring client 203d and center server in some cases, and the monitoring client 203d and center server 210 may be connected via an independent line.

The center server 110 includes an event monitor 110a, which monitors an event issued to the center server 110, and displays an event on the monitor if it informs occurrence of a trouble or the like. The supervisor can detect the state of the trouble that has occurred in the user site by watching that monitor. An event adapter 210a, the PC monitoring client 203d, and the application system 205 issue events to the center server 110. The center server 110 executes a predetermined process in accordance with the contents of the received event. The event includes, e.g., a trouble message or the like.

The device center server 210 includes the event adapter module 210a. The event adapter 210a has a function of periodically searching information sent from the device monitoring server 203a to the device center server 210, selects information that pertains to a trouble occurred in a peripheral device from the found information, converts the selected information into a format (file format, protocol, or the like) that the center server 110 can process, and then issues an event indicating occurrence of a trouble to the center server 110. The conversion performed by the event adapter 210a includes, for example, a process in which an information received from the device monitoring server 203a is converted into data in text format. Further, the center server 110 may have a function of the event adapter module 210a for converting information into a format that it can process. A trouble-related event (trouble event) includes a device where the trouble has occurred, the contents of the trouble, occurrence time, and the like. Since this event adapter 210a is provided to the system and apparatus of the present invention, information (e.g., paper jam, staple function check, or the like) unique to a device obtained by management software using a protocol/format dedicated to a given device can be integrally managed together with information obtained by software which monitors another kind of system/apparatus (versatile computer/server in this embodiment). Trouble information which is managed (detected) by the PC monitoring client that implements a PC monitoring client module, and is sent to the center server 110 includes, e.g., a trouble of an internal RAM of a personal computer, a communication error trouble of the network line, hang of a server, and the like. In this way, according to the present invention, the center server 110 can efficiently and integrally manage various kinds of information such as errors and the like unique to peripheral devices and those unique to PC/server-system equipments.

Upon receiving the event, the event monitor 110a additionally displays the device where the trouble has occurred, the contents of the trouble, occurrence time, and the like to an event list. As the display method, for example, one event is displayed per line, and a list of events is displayed time-serially. In FIG. 2, the event monitor 110a is included in the center server 110. Also, when this event monitor 110a is connected from the device center server 110 to an external apparatus via the network or the like, the device center server 210 and application system 205 can inclusively manage the device system and PC/server system.

Note that the event monitor 110a displays trouble-related events irrespective of event sources, thus calling for supervisor's attention. More specifically, the event monitor 110a can realize time-serial display of trouble events of the versatile computer system issued from the PC monitoring client 203d, and trouble events of the peripheral device system, which are sent from the device monitoring server 203a to the device center server 210 and are issued via the event adapter 210a, in an event list on a single screen.

An example of the data exchange sequence done between the device center server 210 and device monitoring server 203a will be described with reference to FIG. 4 in three cases (1) downloading of setup values from the device center server 210 to devices, (2) uploading of log data from the device monitoring server 203a to the device center server 210, and (3) a counter data request from the device center server 210 to the device monitoring server 203a. Prior to this description, the data format will be briefly explained.

FIG. 8 shows an example of the message format exchanged between the device center server 210 and device monitoring server 203a. One message includes a flag field, data type field, job ID field, return value field, data length field, and data field. The flag field contains bits indicating a communication means and a bit indicating if the message is a final frame of data.

The data type field indicates the type of data, e.g., authentication request data (data sent at the head of a session), setup value data to be downloaded, a device information request (to be described later), an event information message, or a log data processing request. For example, in case of a trouble message or the like, the data type field indicates event information, and the data field indicates its contents.

The job ID field indicates the type of session, e.g., parameter setup, acquisition of device information, event message, and the like. The data length field indicates the length of data which follows, and the data field stores data with the length indicated by the data length field. In a setup value download message or log data processing request, the data field stores data. In a counter upload message, the data field of a response to the device information request stores device information.

The device center server 210 and device monitoring server 203a execute the following processing sequences while exchanging such messages. In the following description, an event means a message that informs occurrence of an event.

<Setup Value Download Sequence>

Figure 4:
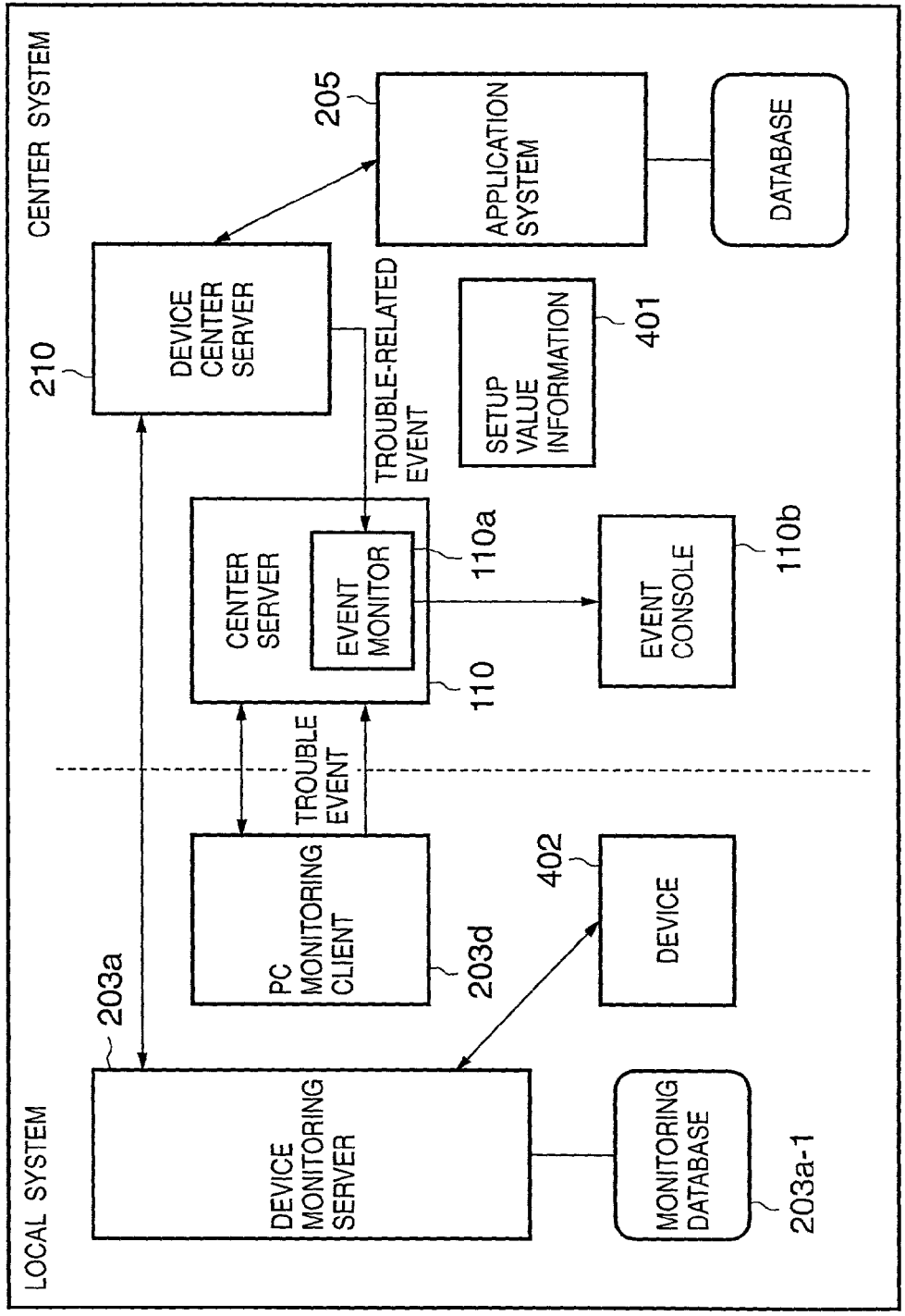
FIG. 4 is a block diagram for explaining the data exchange sequence executed between a local system and center system.

FIG. 4 is a block diagram for explaining the data exchange sequence done between the local system and center system.

Setup values are downloaded as follows.

(1) In the application system 205, a setup value information file 401 is generated by, e.g., manually inputting designation of a device to be set, the IP address of the device, a setup value of a threshold value upon informing the local device server of an alarm of, e.g., an error, and the like.

(2) The application system 205 establishes a session with the device center server 210, and sends setup value data contained in the setup value information file 401.

(3) Upon receiving the setup value data, the device center server 210 establishes a session with the device monitoring server 203a, and sends the setup value data to the device monitoring server 203a.

(4) Upon receiving the setup value data, the device monitoring server 203a sends the setup value to the device. This sequence is determined for each device.

(5) Upon completion of the device setup, the device monitoring server 203a sends a setup end message to the device center server 210.

(6) The device center server 210 sends a setup end message to the application system 205.

After that, the application system 205 releases the session with the device center server 210, which releases the session with the device monitoring server 203a.

In this way, when the device monitoring server 203a and device center server 210 directly communicate with each other, the device setup information can be downloaded to a device 402.

Note that a trouble event is issued as follows.

(7) When the PC monitoring client 203d detects any trouble in the server or PC and issues a trouble event, it directly issues the event to the center server. Assume that the PC/server-system equipments are connected to the PC monitoring client, as described above with reference to FIG. 2 (not shown in FIG. 4). Also, the inventory database 109 that stores various data of, e.g., trouble management, server requests, call reception, and the like is connected to the PC monitoring client and center server, so that the PC monitoring client and center server can access the database.

(8) When the device monitoring server 203a detects any trouble of the device 402, it sends the trouble information to the device center server 210.

(9) Upon receiving the trouble information in the device 402, the device center server 210 issues an event that informs occurrence of the trouble to the center server 110 on the basis of the received information. The device center server 210 in FIG. 4 includes the event adapter 210a in FIG. 2, which issues a trouble-related event shown in FIG. 4.

(10) Since the event issued is a trouble-related event, the event monitor 110a controls an event console 110b to display the trouble information, and updates the event list.

In this manner, since the event that informs a trouble is processed via the center server 110 irrespective of its source (device system or versatile computer system) in the user site, the supervisor can monitor information of all device-system equipments or versatile computer-system equipments of the user site by monitoring the event console 110b of the center server. Information displayed on the event console may be printed out or may undergo a process to be displayed on, e.g., a portable terminal of a service person. The printed information may be sent to the user by mail, and the information displayed on the portable terminal of the service person may be used as, e.g., service person call. In this way, integrally managed information of the device system and versatile PC/server system can be used in various situations.

In the above description, a trouble that has occurred in the device system is displayed on the event console 110b through the event monitor 110a in FIG. 4. As a characteristic feature of the present invention, not all pieces of trouble information that have been generated in the device system are displayed on the event console 110b. That is, the system of the present invention has a function of determining as to whether or not to send information to the device center server 210 depending on the trouble level of the device.

For example, the device monitoring server 203a does not send any error message to the device center server 210 when a door open error in the copying machine or the like, or an error that can be recovered by resetting using a power-ON/OFF function of the device has occurred. On the other hand, no service person call is made when an error that a customer can cope with, e.g., an error such as a temperature rise of the device, which does not influence the current operation, or a jam error has occurred.

When such determination function database used to determine if a trouble message is sent to the center server is stored in any of devices such as the monitoring database 203a-1, device 402, and the like, the necessity of an information message from the device to the center can be determined.

Also, when the determination function database used to determine if trouble information received by the center server 110 is displayed on the event console 110b or if a service person call is to be made is stored in any devices on the center system side such as the application system 205 on the center server side, inventory database 109, center server 110, and the like, the function of the present invention can be achieved.

Since the system of the present invention has such filtering function upon transferring information, the traffic between the local and center systems can be reduced, and the supervisor on the center side can clearly and easily recognize significant error information.

<Counter Upload Sequence>

The counter value upload sequence, i.e., device information collection sequence is executed as follows. The counter value includes a value indicating the number of pages printed by the copying machine or printer, a mode counter indicating the frequencies of use of various modes of a device, and the like, and serves as a basis upon calculating a maintenance fee. When such values are uploaded in response to a request from the center system, device information including the counter values from office equipments can be collected. Since the counter upload sequence is executed in response to a request from an application, the center system (supervisor site) serves as an initiator.

(1) The application system 205 establishes a session, and sends a device information request to the device center server 210. The device information request contains, e.g., information for designating an objective device in the local system.

(2) Upon receiving the device information request, the device center server 210 establishes a session with the device monitoring server 203a, and sends the device information request to the device monitoring server 203a.

(3) Upon receiving the device information request, the device monitoring server 203a acquires device information from the designated device. This sequence is determined for each device, and information determined for each device or designated information is acquired.

(4) After the device information is acquired, the device monitoring server 203a sends a device information response containing the acquired device information to the device center server 210.

(5) The device center server 210 sends the device information response to the application system 205.

After that, the application system 205 releases the session with the device center server 210, which releases the session with the device monitoring server 203a.

In this way, when the device monitoring server 203a and device center server 210 directly communicate with each other, device information can be acquired.

Note that a trouble message is sent in the same manner as in the setup value download sequence.

<Log Data Upload Sequence>

Log data is uploaded as follows. Log data is a history of information of alarms and the like that have occurred in peripheral devices, and is spontaneously sent to the supervisor site when the occurrence of an abnormality is imminent although it may not have reached the level of an error (e.g., alarms have been generated a predetermined number of times or more). Therefore, in the log data upload process, the user site (local system) serves as an initiator unlike in the counter upload process.

(1) The device monitoring server 203a collects logs of devices. When the collected log size has exceeded a predetermined value or when the frequency of generation of alarms has exceeded a predetermined rate, the device monitoring server 203a starts to upload log data.

(2) The device monitoring server 203a establishes a session, and sends a log data processing request containing log data to the device center server 210.

(3) Upon receiving the log data processing request, the device monitoring server 203a establishes a session with the device center server 210, and sends the log data processing request to the device center server 210.

(4) Upon receiving the log data processing request, the device center server 210 establishes a session with the application system 205, and sends the log data processing request to the application system 205 that processes log data.

(5) Upon receiving the log data processing request, the application system 205 processes the log data received together with the request, and sends a log data processing response to the device center server 210.

(6) The device center server 210 sends the log data processing response to the device monitoring server 203a.

(7) The device monitoring server 203a releases the session with the device center server 210, and executes a post process. In the post process, if the log data processing response indicates that the processing of the log data has normally been terminated, the server 203a erases the log data, and the like.

After that, the device center server 210 releases the session with the application system 205.

In this way, when the device monitoring server 203a and device center server 210 directly communicate with each other, the log information can be uploaded.

Note that a trouble message is sent in the same manner as in the setup value download sequence.

<Processing Sequence by Device Center Server>

Figure 5:
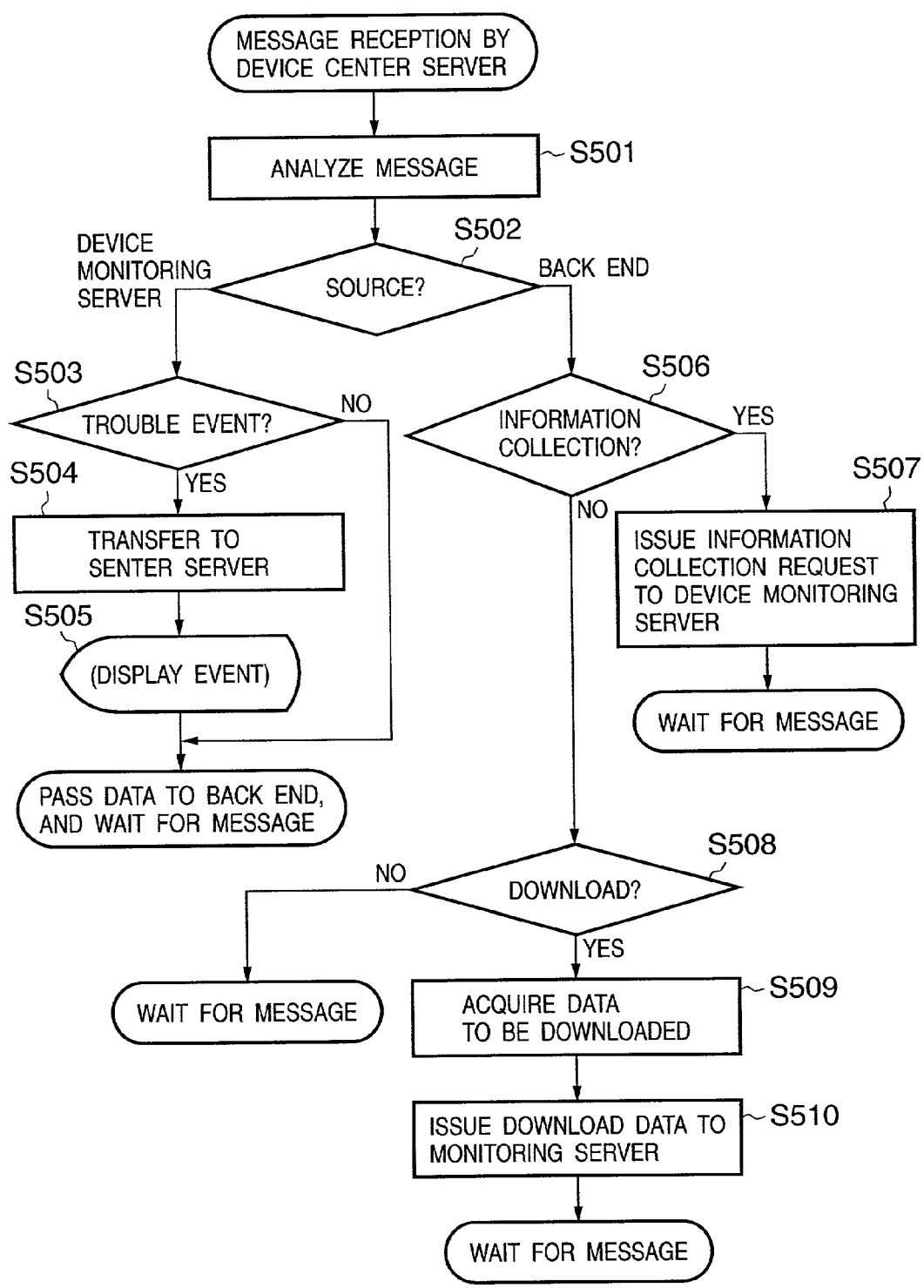
FIG. 5 is a flow chart showing the processing sequence of a device center server upon receiving a message.

The processing sequences in the device center server 210 and device monitoring server 203a will be briefly explained below. FIG. 5 is a flow chart showing the processing sequence of the device center server upon receiving a message. Note that this message is received not only from the device monitoring server but also from the application system 205. The format of this message may be different from that shown in FIG. 8. In any case, the format allows to identify the source of a message, or a different process is executed depending on the source. This embodiment adopts the former.

Upon receiving a message, the processing shown in FIG. 5 starts. The received message is analyzed (step S501) to check its source (step S502). The source may be identified by appending an address or the like to a message. Also, the source can be identified by the contents of the message. For example, if the message is a log processing request, the source is the device monitoring server; if the message is a setup value download request, the source is the application system (indicated by a "back end" in the flow chart) 205.

If the source is the device monitoring server 203a, it is checked if the message is a trouble event (step S503). If the message is a trouble event, data in the message is converted into a format, e.g. the text format, that the center server 110 can process, and the converted message is transferred to the center server 110 (step S504). In the center server 110, the trouble location, contents, time, and the like are read out from data contained in that message, and are displayed (step S505). If the message is not a trouble event, the data is passed to the back end, which executes a process according to the message, and the control waits for the next message. The data passed to the back end includes, e.g., a log data processing request and collected device information.

On the other hand, if the source is the back end, i.e., the application system 205, it is checked if the message is a device information collection request (step S506). If YES in step S506, a device information collection request is sent to the device monitoring server 203a (step S507), and the control then waits for the next message.

If the message is not a device information collection request, it is checked if the message is a setup value download request (step S508). If the message is a setup value download request, the received download information is acquired (step S509), and is sent to the device monitoring server 203a (step S510).

<Processing Sequence by Device Monitoring Server>

Figure 6:
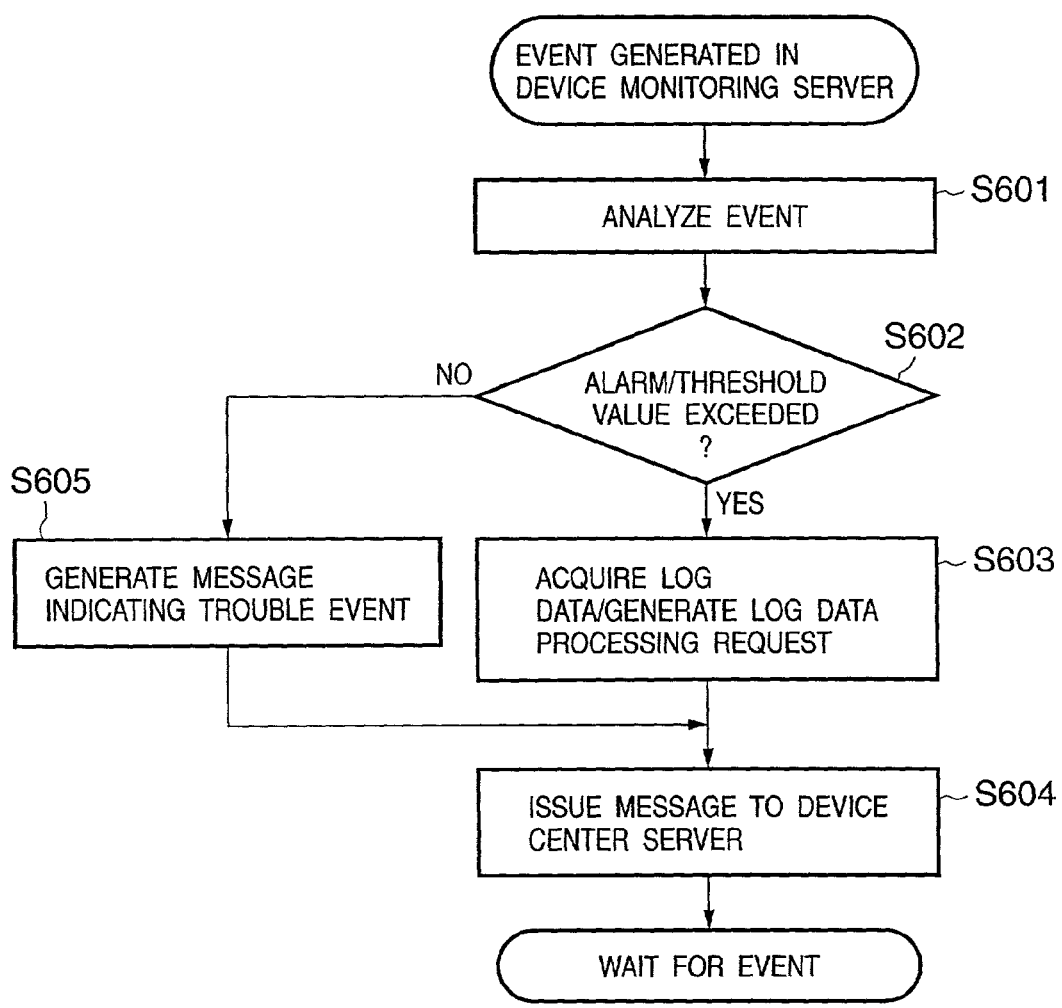

FIG. 6 is a flow chart showing the processing sequence for events generated in the device monitoring server 203a.

If some event is generated, the generated event is analyzed (step S601). If the event is an alarm from a device and a predetermined threshold value has been exceeded (step S602), log data stored so far are acquired to generate a log data processing request message (step S603), and a log processing request is issued to the device center server 210. If the threshold value has not been exceeded, the alarm is stored in the log.

On the other hand, if the event is not an alarm, it is determined in this embodiment that an error has occurred, and a message indicating a trouble event is generated (step S605). The message is sent to the device center server 210 in step S604.

Figure 7:
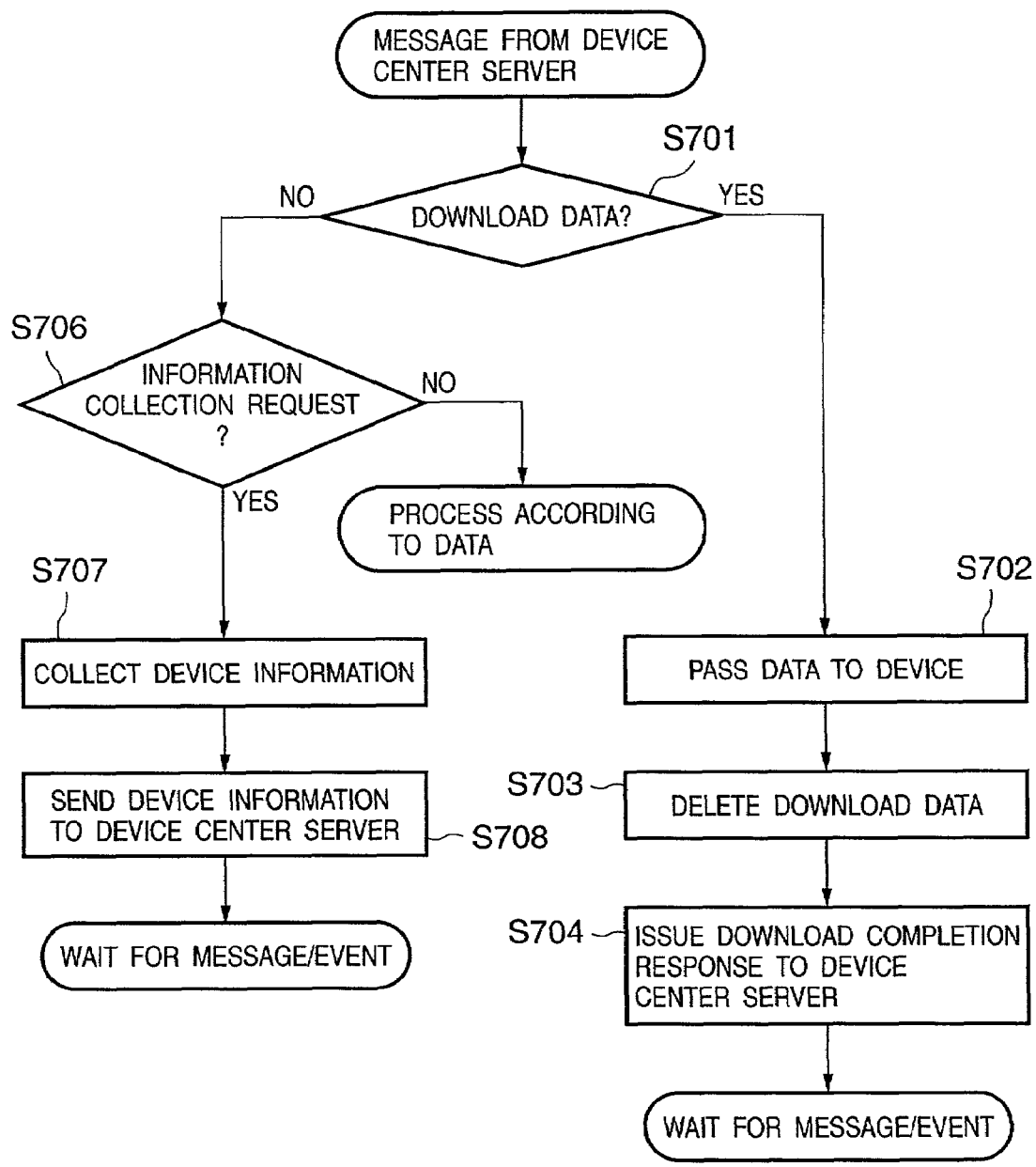
FIG. 7 is a flow chart showing the sequence of the device monitoring server 203a upon receiving a message from a device center server 210.

FIG. 7 is a flow chart showing the sequence of the device monitoring server 203a upon receiving a message from the device center server 210.

It is checked if the received message is a setup value download request (step S701). If YES in step S701, a setup process based on the received setup value data is executed between the device monitoring server 203a and device (step S702). The local plugin 203b deletes that data (step S703), and a response message indicating that download is complete is issued to the device center server 210 (step S704). Note that the local plugin 203b need only be logically connected to the device monitoring server 203a, and may be physically separated as long as it is connected.

If the message is not a setup value download request, it is checked if the message is a device information collection request (step S706). If YES in step S706, information is collected from the designated device (step S707), and that device information is sent to the device center server (step S708).

With the aforementioned sequences, trouble events generated by the management system for versatile computers and that for peripheral devices can be integrally managed as combined information in the supervisor site. The present invention is not limited to a system for matching management information of the device system to the management software of the PC/server system, but may be applied to a system for matching management information of the PC/server system to the management software of the device system. For example, the event adapter 210a in FIG. 2 may be provided to the center server 110 to inform the device center server 210 of an event generated in the device server.

As shown in FIG. 2, when the line for connecting the device monitoring server 203a and device center server 210 may use the same line as that for connecting the PC monitoring client 203d and center server 110, and is shared using, e.g., a router, the number of lines can be reduced. Such arrangement is effective when a dedicated line is used as the line.

Second Embodiment

An office equipment monitoring system as the second embodiment of the present invention will be described below with reference to the accompanying drawings. The system of this embodiment is different from that in the first embodiment in the way logical channels are defined between the supervisor site and user site. In the first embodiment, the communication line can be shared, but a channel for connecting the device monitoring server 203a and device center server 210, and a channel for connecting the PC monitoring client 203d and center server 110 are logically independent from each other. When the device center server 210 receives a trouble event message from the device monitoring server 203a, it sends an event that informs occurrence of a trouble to the center server 110, thus integrating trouble events on the event monitor.

By contrast, in this embodiment, neither the device center server 210 nor a channel for connecting the device monitoring server 203a and device center server 210 are present. In place of the device center server, a device information processing module 901 is arranged in the center server 110 (although independently illustrated in FIG. 9), and processes device-system information received by the center server 110. In this arrangement, when a commercially available PC monitoring client 203d and center server 110 are used, a device-system message is output to a channel established between them. In this fashion, in addition to the merit of commonly using the line as in the first embodiment, neither an independent communication channel for device-system information, nor an independent device center server need be prepared.

<System Arrangement>

FIG. 9 is a block diagram showing the arrangement of software modules in an office equipment management system of this embodiment. A user local system (corresponding to the user site) includes both device-system equipments (peripheral devices such as a copying machine, printer, multi-function machine, scanner, FAX, and the like), and PC/server-system equipments (versatile computers). The device-system equipments and PC/server-system equipments are respectively managed by the device monitoring server 203a and the PC monitoring client 203d, as in the first embodiment.

A center system (corresponding to the supervisor site) includes a device information processing module 901 for exchanging data with the device monitoring server 203a, and the center server 110 for exchanging data with the PC monitoring client 203d. The inventory database 109 stores management information of the device-system equipments and PC/server-system equipments. FIG. 9 illustrates the database 109 as a single database, which may be logically or physically separated into those for the device system and PC/server system. The information in the database is used by the application system 205, center server 110, and the like as in the first embodiment.

The supervisor site and user site are connected via a single line between routers 204. The PC monitoring client 203d and center server 110 can be realized by a commercially available site management system. All messages are exchanged via a channel formed by the PC monitoring client 203d and center server 110 provided by this commercially available management system. Note that FIG. 9 illustrates the device information processing module 901 as an independent module (corresponding to the device center server 210 in FIG. 2). Alternatively, this function may be implemented as the internal function of the center server 110.

The device monitoring server 203a and PC monitoring client 203d are connected via the local plugin module 203d for converting the data format and protocol as needed. That is, the local plugin module 203b has a function of converting information of the device monitoring server into the format (or protocol) of the PC monitoring client 203a and vice versa. A plugin on the center side that exchanges data between the center server 110 and device information processing module 901 (corresponding to the server plugin in FIG. 2) may have a function equivalent to that of the local plugin module 203b.

As will be described later, the local plugin module 203b has a role of passing a message from the device monitoring server 203a to the PC monitoring client 203d, and controlling the client 203d to send it to the designated destination, and a role of periodically polling the contents of a predetermined data area where the PC monitoring client 203d writes data, and passing a message addressed to the device monitoring server 203a to the server 203a if it is found.

In accordance with the received message, the center server 110 passes that message to the device information processing module and controls it to process the message if the contents of the message are information that pertains to a device, or controls the event monitor 110a to display the generated event in an event list in the display format that allows to identify a device-system event or PC/server-system event if the message informs generation of an event. The device-system event is generated from the device information processing module 901.

Since the plugin having the format conversion function between the device system and PC/server system is inserted, the functions of commercially available PC/server-system management software can be applied, and the device-system information can be exchanged between the local system and management center. Information unique to a device, which cannot be circumstantially managed by the commercially available PC/server-system management software, can be processed by the device information processing module after data associated with the contents of the device system is converted from the PC/server-system format into the device-system format. For this reason, when device information is to be circumstantially managed, only the device information processing module need be developed, and development/design efficiency can be improved.

An example of the message exchange sequence done between the local system (user site) and center system (supervisor site) will be described with reference to FIGS. 10 to 12 in three cases (1) downloading of setup values from the device center server 210 to devices, (2) uploading of log data from the device monitoring server 203a to the device center server 210, and (3) a counter data request from the device center server 210 to the device monitoring server 203a.

<Setup Value Download Sequence>

Figure 10:
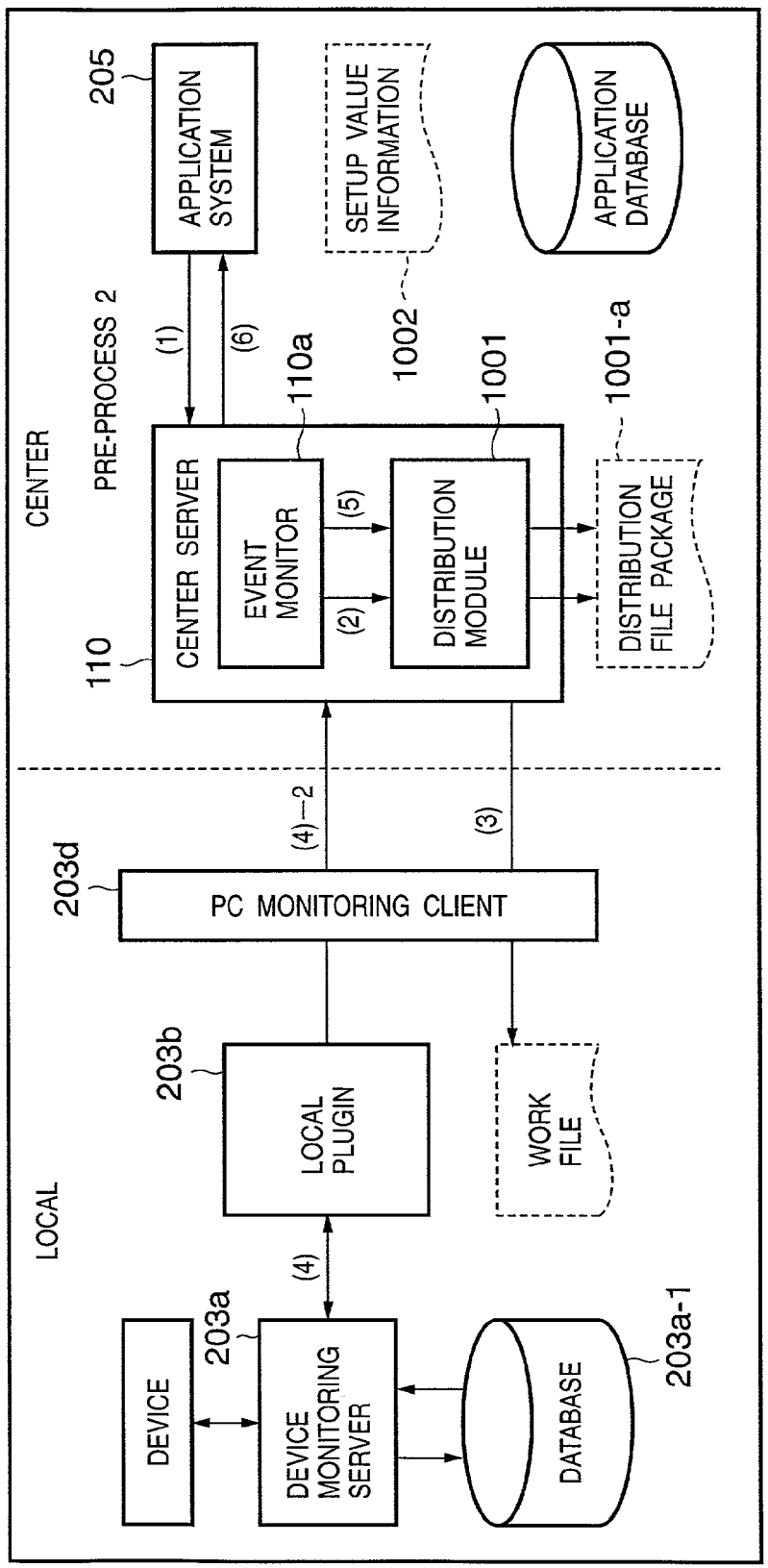
FIG. 10 is a flow chart for explaining the sequence for downloading setup values to devices between the local system and center system.

FIG. 10 is a block diagram for explaining the sequence for downloading setup values to devices between the local system and center system. Setup values are downloaded as follows.

In the application system 205, a setup value information file 1002 is generated by, e.g., manually inputting designation of a device in which a setup value is to be set, a setup value itself, and the like.

(1) The application system 205 establishes a session with the center server 110.

(2) In the center server 110, a distribution module 1001 is launched, and generates a distribution file package 1001a from the setup value information file 1002.

(3) The distribution module 1001a sends the distribution package file to the PC monitoring client 203d, and makes the client 203d store it as a work file.

(4) The local plugin 203b periodically monitors a data file that the PC monitoring client 203d stores, and when the plugin 203b detects that the PC monitoring client generates a work file, it informs the device monitoring server of the arrival of a setup value, and passes the setup value data to the device monitoring server 203a. The device monitoring server 203a sets the setup value in the designated device.

(4-2) The local plugin 203b sends a setup end message to the center server via the PC monitoring client 203d.

(5) In the center server 110, the distribution module 1001 deletes the distribution package file 1001a.

(6) The center server 110 sends a setup end message to the application system 205.

In this way, when the setup value data is passed to the device monitoring server 203*a*, device setup information can be downloaded to the device.

As for a trouble that has occurred in the device system, a trouble event is sent from the local plugin 203*b* to the center server 110 via the PC monitoring client 203*d* as in step (4-2). The event that informs a trouble is processed by the event monitor 110*a* of the center server 110, and is displayed in an event list.

<Counter Upload Sequence>

Figure 11:
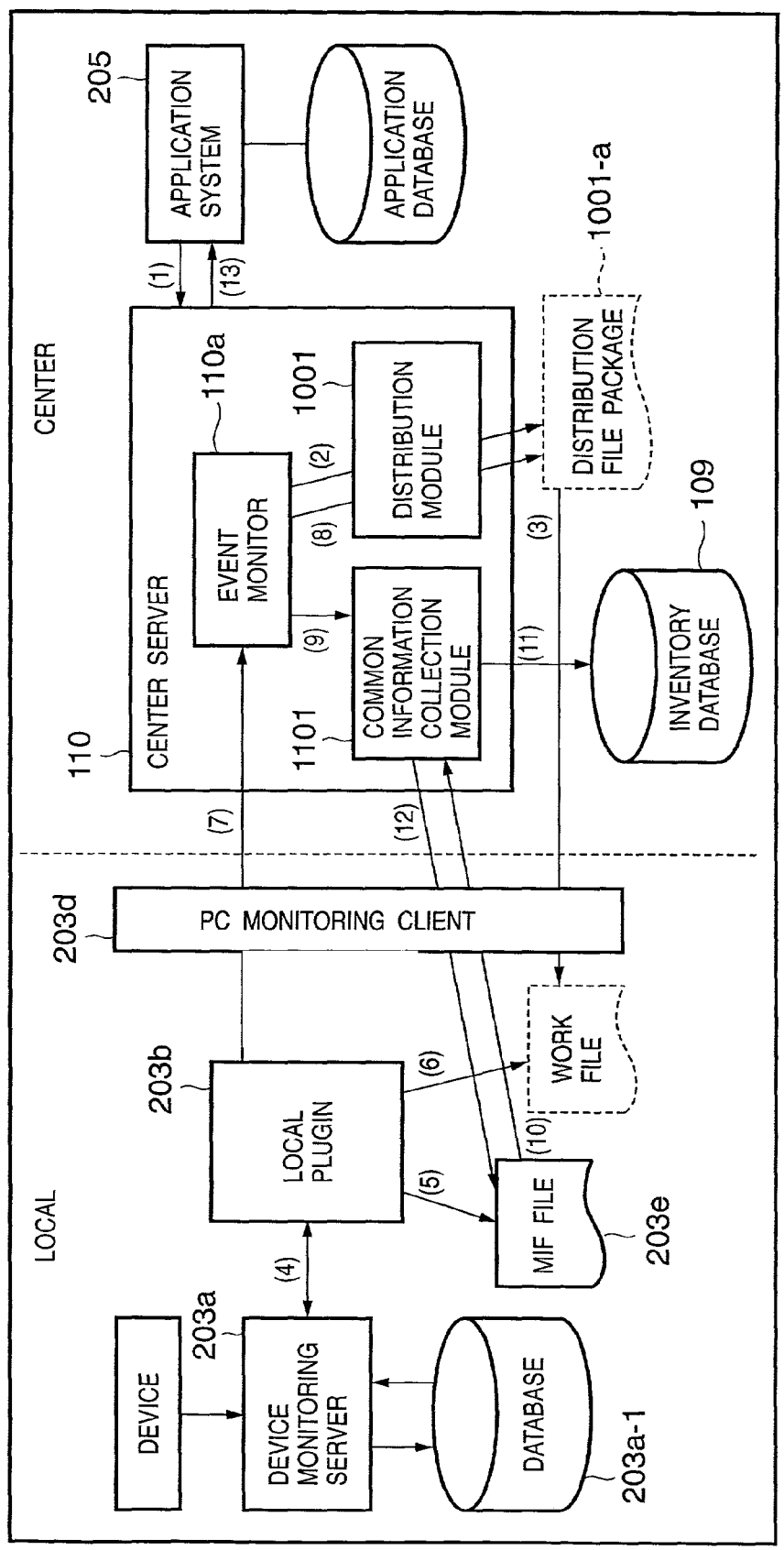
FIG. 11 is a flow chart for explaining the count data upload sequence, i.e., device information collection sequence executed between the local system and center system.

FIG. 11 is a flow chart for explaining the counter data upload sequence, i.e., the device information collection sequence done between the local system and center system. Device information is uploaded as follows.

(1) The application system 205 stores an information request command in a file, and issues a message (event) serving as trigger of information collection to the center server 110.

(2) The event monitor analyzes the event from the application system 205, and launches the distribution module 1001 to generate a distribution file package 1001*a* of the information request command.

(3) The center server 110 sends the generated distribution packet containing the information request command to the PC monitoring client 203*d*. The PC monitoring client 203*d* stores the received file as a work file. Note that the work file is a general-purpose file in the PC/server management system, and corresponds to the entity of the distribution file package 1001*a*.

(4) When the local plugin 203*b* detects that the PC monitoring server 203*d* stores a file, it reads the stored file, and passes it to the device monitoring server 203*a*. The device monitoring server 203*a* collects device information from the designated device in response to the command in that file, and passes the collected information to the local plugin 203*d*.

(5) The local plugin 203*b* stores the received device information as a file 203*e* in a predetermined format. This embodiment will exemplify an MIF format as the predetermined format. The MIF format is a general file format of an information management system.

(6) The local plugin 203*b* deletes the work file.

(7) The local plugin generates an event indicating generation of the MIF file, and sends it to the center server 110.

(8) Upon receiving that event, the center server 110 deletes the distribution file package.

(9) If the event received from the local plugin 203*b* indicates normal completion of information collection, the center server 110 launches a common information collection module 1101, and makes it load the MIF file generated by the local plugin and collect device information.

(10) The common information collection module 1101 loads an MIF file 203*e*, and acquires the collected device information.

(11) The common information collection module 1101 stores the collected device information in the inventory database. Note that the inventory database physically or logically has databases for the device system and PC/server system, and can execute flexible processes in correspondence with objective devices.

(12) The center server instructs to delete the MIF file 203*e* on the local side.

(13) A completion message is sent to the application system.

In this way, the center server 110 can acquire the device information collected by the device monitoring server 203*a*.

<Log Data Upload Sequence>

Figure 12:
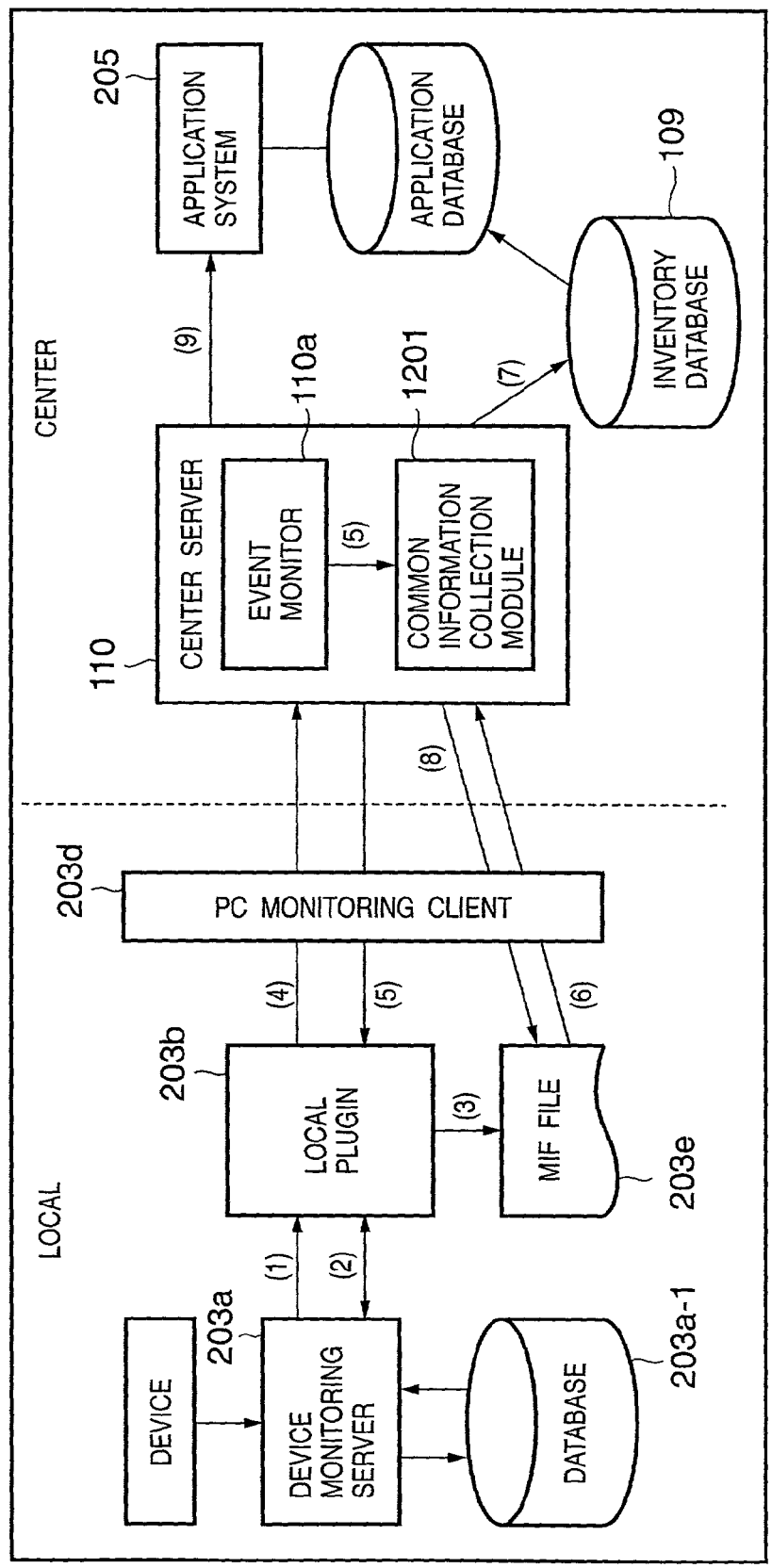
FIG. 12 is a flow chart for explaining the log data upload sequence from the local system to the center system.

FIG. 12 is a flow chart for explaining the log data upload sequence from the local system to the center system. In this embodiment, log data is uploaded as follows.

(1) The device monitoring server 203*a* issues a detection message indicating that the number of times of errors or alarms has exceeded a threshold value to the local plugin 203*b*.

(2) The device monitoring server 203*a* issues event data of the aforementioned alarm to the local plugin 203*b*.

(3) The local plugin 203*b* stores log data as an MIF format file 203*e*. Note that the MIF format is a general file/data format of an information management system, as described above.

(4) The local plugin 203*b* generates an event indicating generation of the MIF file, and sends it to the center server 110.

(5) Upon receiving the event, the center server 110 launches a common information collection module 1201.

(6) The common information collection module 1201 loads the MIF file 203*e* generated by the local plugin 203*b* to read the log file.

(7) The common information collection module 1201 stores acquired device information in the inventory database 109.

(8) The center server instructs to delete the MIF file 203*e* on the local side.

(9) A completion message is sent to the application system.

In this manner, the center server 110 can acquire the log data file generated by the device monitoring server 203*a*.

<Processing Sequence by Device Center Server>

Figure 13:
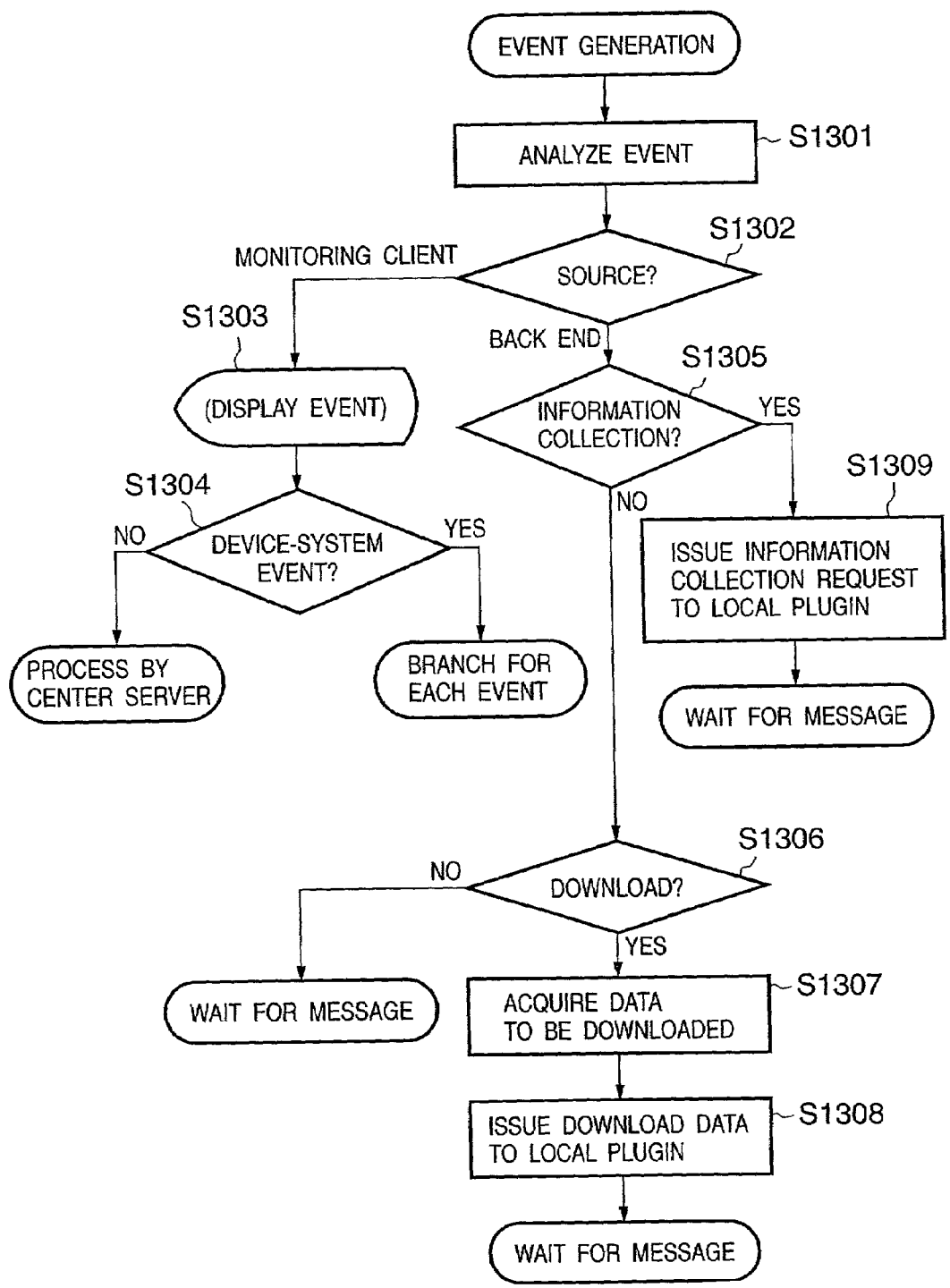
FIG. 13 is a flow chart showing the processing sequence of the center server 110 upon receiving an event.

The processing sequences by the center server 110, device information processing module 901, local plugin 203*b*, and PC monitoring client 203*d* will be briefly explained below. FIG. 13 is a flow chart showing the processing sequence of the center server 110 upon receiving an event. Upon receiving an event, the processing shown in FIG. 13 starts. In the following description, a message and event are not strictly distinguished from each other. That is, an event means a message that informs generation of an event.

The received event is analyzed (step S1301) to check its source (step S1302). If the source is the PC monitoring client 203*d*, the event is processed by the event monitor, and if the event is a trouble event, it is displayed in an event list (step S1303).

Figure 14:
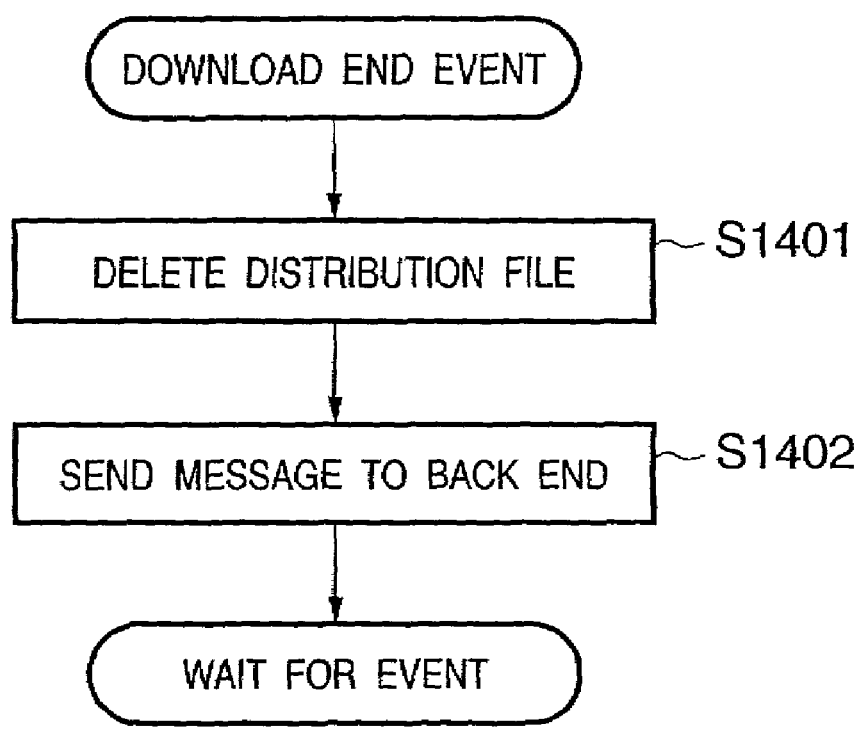
FIG. 14 is a flow chart showing the processing sequence of a device information processing module 901 for a download end event.
Figure 15:
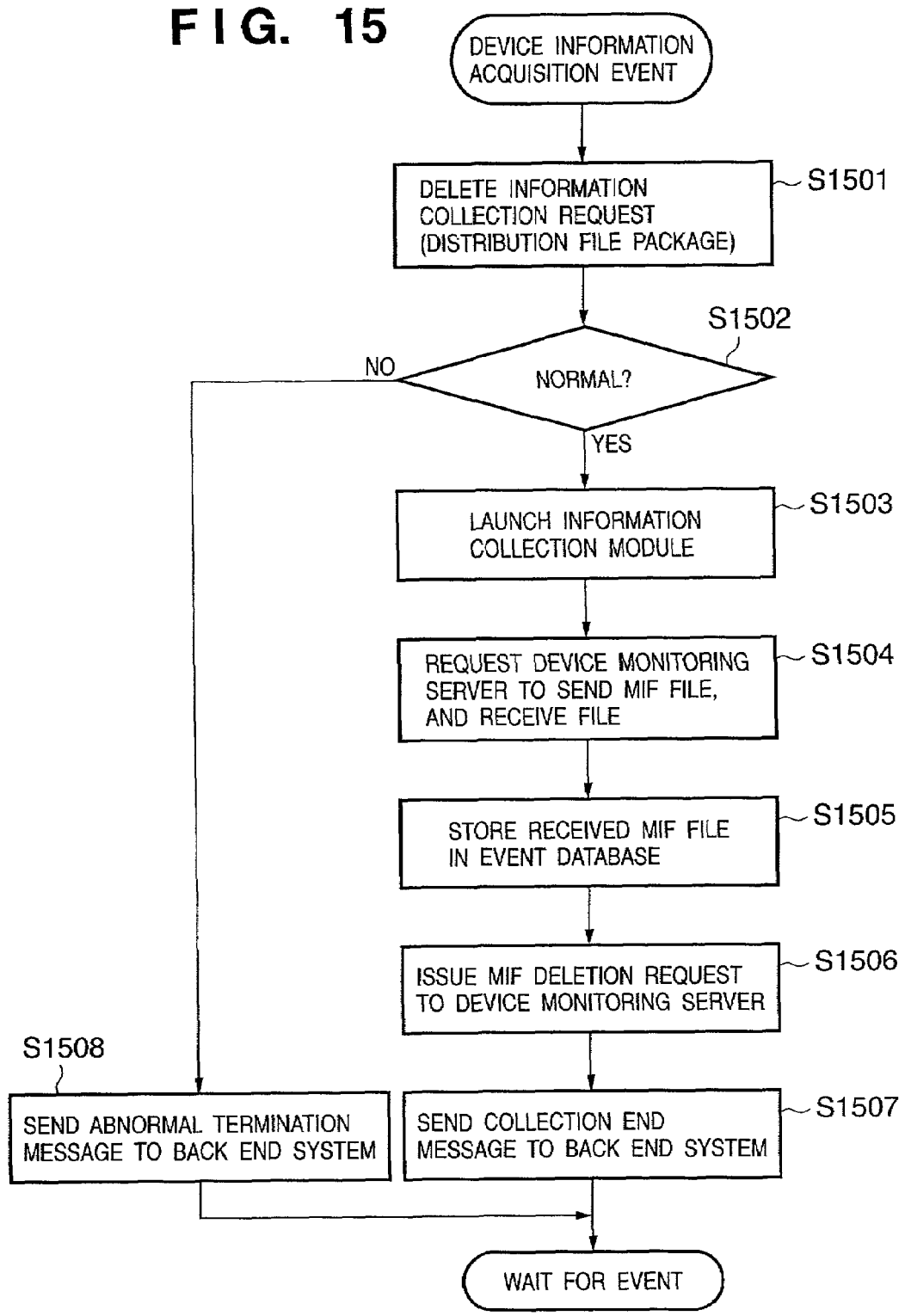
FIG. 15 is a flow chart showing the processing sequence of the device information processing module 901 in response to a device information acquisition (counter upload) message.
Figure 16:
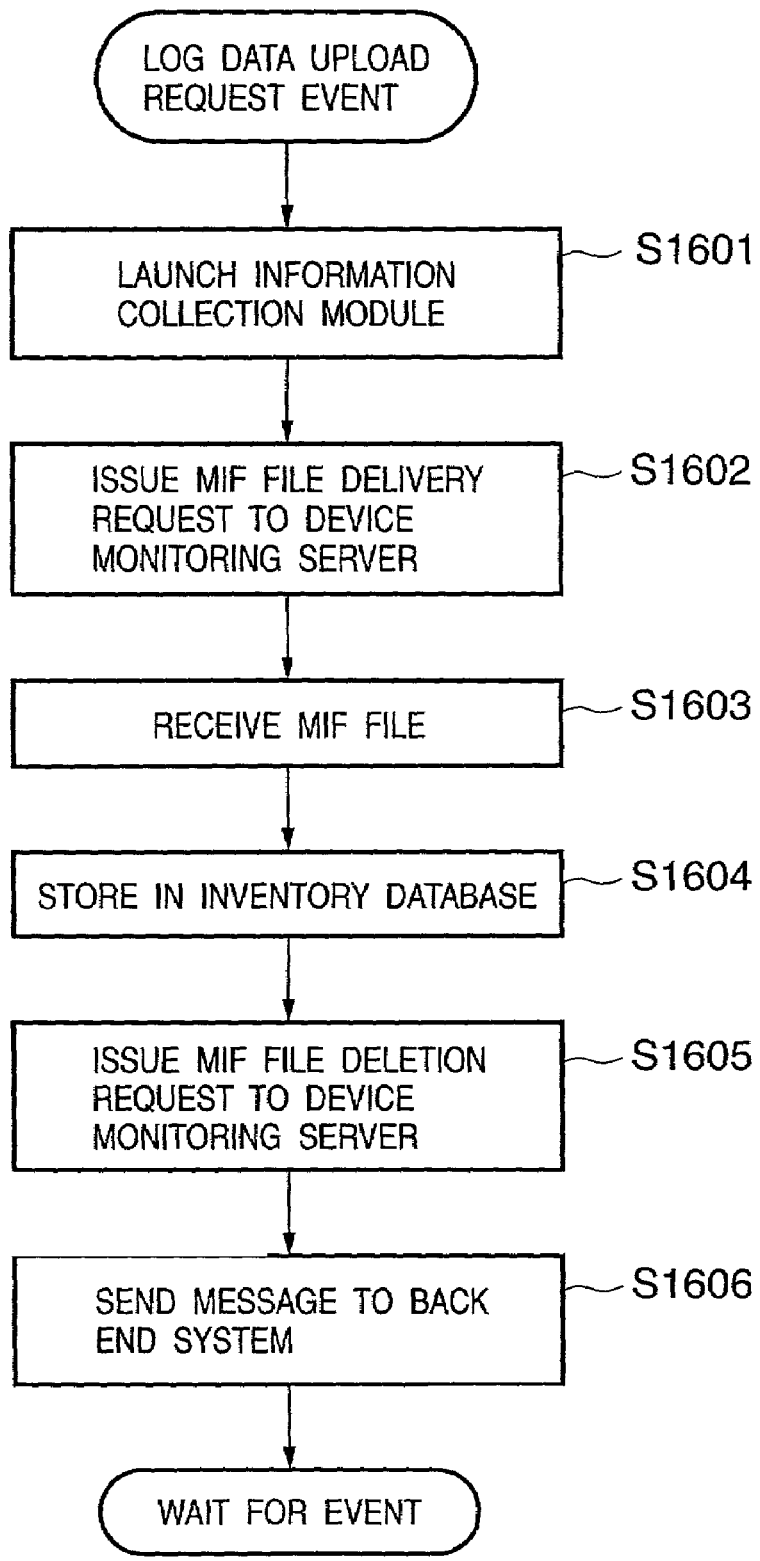
FIG. 16 is a flow chart showing the processing sequence of the device information processing module 901 in response to a log data upload message.

After that, it is checked if the event is associated with the device system, i.e., if that event has been issued by the local plugin 203*b* (step S1304). If YES in step S1304, the device information processing module executes a process corresponding to the event. This sequence is shown in FIGS. 14 to 16. If the event is not associated with the device system, the center server 110 executes a process corresponding to the event.

If the event source is the back end, i.e., the application system, it is checked if the event is an information collection request (step S1305). If YES in step S1305, the information collection request is issued to the local plugin module 203*b* (step S1309). The information collection request is executed by controlling the distribution module 1001 that executes the request to generate a distribution file package, and to distribute it.

If the event is not an information collection request, it is checked if the event is a download request (step S1306). If NO in step S1306, a process corresponding to the event is executed, and the control waits for the next event.

If the event is a download request, data to be downloaded is acquired from the back end (step S1307), and the download data is distributed to the local plugin 203b (step S1308).

<Processing Sequence by Device Information Processing Module>

The event which is determined to be the device-system event in step S1304 in FIG. 13 is further analyzed, and the flow branches to three different processes (1) a download end message event, (2) a device information collection end event, and (3) a log data upload request event. These processes respectively correspond to the sequences shown in the flow charts in FIGS. 14 to 16.

(Download End)

FIG. 14 is a flow chart showing the processing sequence of the device information processing module 901 in response to a download end event. Upon receiving a download end message, the distribution file package 1001a is deleted (step S1401), and a download end message is sent to the back end (step S1402).

(Device Information Acquisition)

FIG. 15 is a flow chart showing the processing sequence of the device information processing module 901 in response to a device information acquisition (counter upload) message.

Initially, the distribution file package 1001a which was generated to issue an information collection request is deleted (step S1501). If data acquisition has normally be done, the information collection module 1101 is launched (step S1503), requests the device monitoring server 203a to send an MIF file that stores device information, and receives the MIF file as a response to that request (step S1504).

The received file is stored in the inventory database 109 (step S1505), and an MIF file deletion request is sent to the device monitoring server 203a (step S1506). Finally, a device information collection end message is sent to the back end (step S1507).

On the other hand, if it is determined in step S1502 that data acquisition has not normally been done, a message indicating this is sent to the back end (step S1508).

In this way, the device information generated as the MIF file is acquired from the device monitoring server 203a.

(Log Data Upload)

FIG. 16 is a flow chart showing the processing sequence of the device information processing module 901 in response to a log data upload message.

Upon receiving a log data upload message, the common information processing module 1201 is launched (step S1601) to issue a delivery request of an MIF file containing log data to the device monitoring module 203a (step S1602).

The MIF file as a response to the request is received (step S1603), and is stored in the inventory database 109 (step S1604). An MIF file deletion request is issued to the device monitoring server 203a (step S1605), and upon completion of that process, a processing end message is sent to the back end (step S1606).

<Processing Sequence by Device Monitoring Server>

Figure 17:
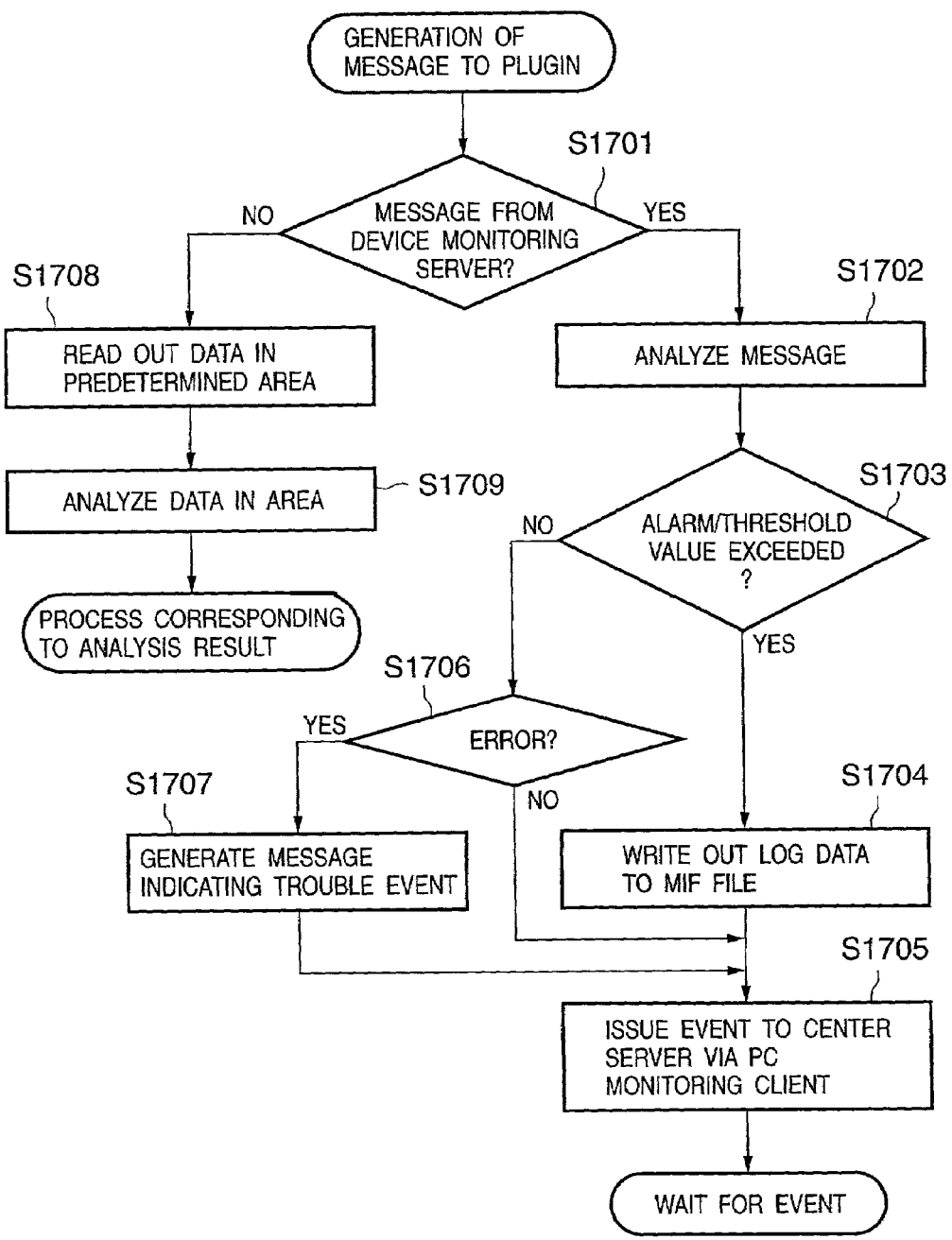
FIG. 17 is a flow chart showing the processing sequence of a local plugin 203b in response to a message or event issued thereto.

FIG. 17 is a flow chart showing the processing sequence of the local plugin 203b in response to a message or event issued thereto. Since the monitoring client 203d stores a message issued from the center server 110 to the local plugin 203b in a predetermined area, the local plugin 203b always or periodically monitors that access.

Upon receiving the message, it is checked if the message comes from the device monitoring server 203a (step S1701). If YES in step S1701, the message is analyzed (step S1702).

If the message indicates an alarm or that a threshold value has been exceeded, log data is written out as an MIF file, and a log file upload event message is issued to the center server 110 via the PC monitoring client 203d (step S1705).

If the message does not indicate an alarm or that a threshold value has been exceeded, it is checked if the message indicates an error (step S1706). If YES in step S1706, a trouble event message is generated (step S1707), and the flow advances to step S1705.

Figure 18:
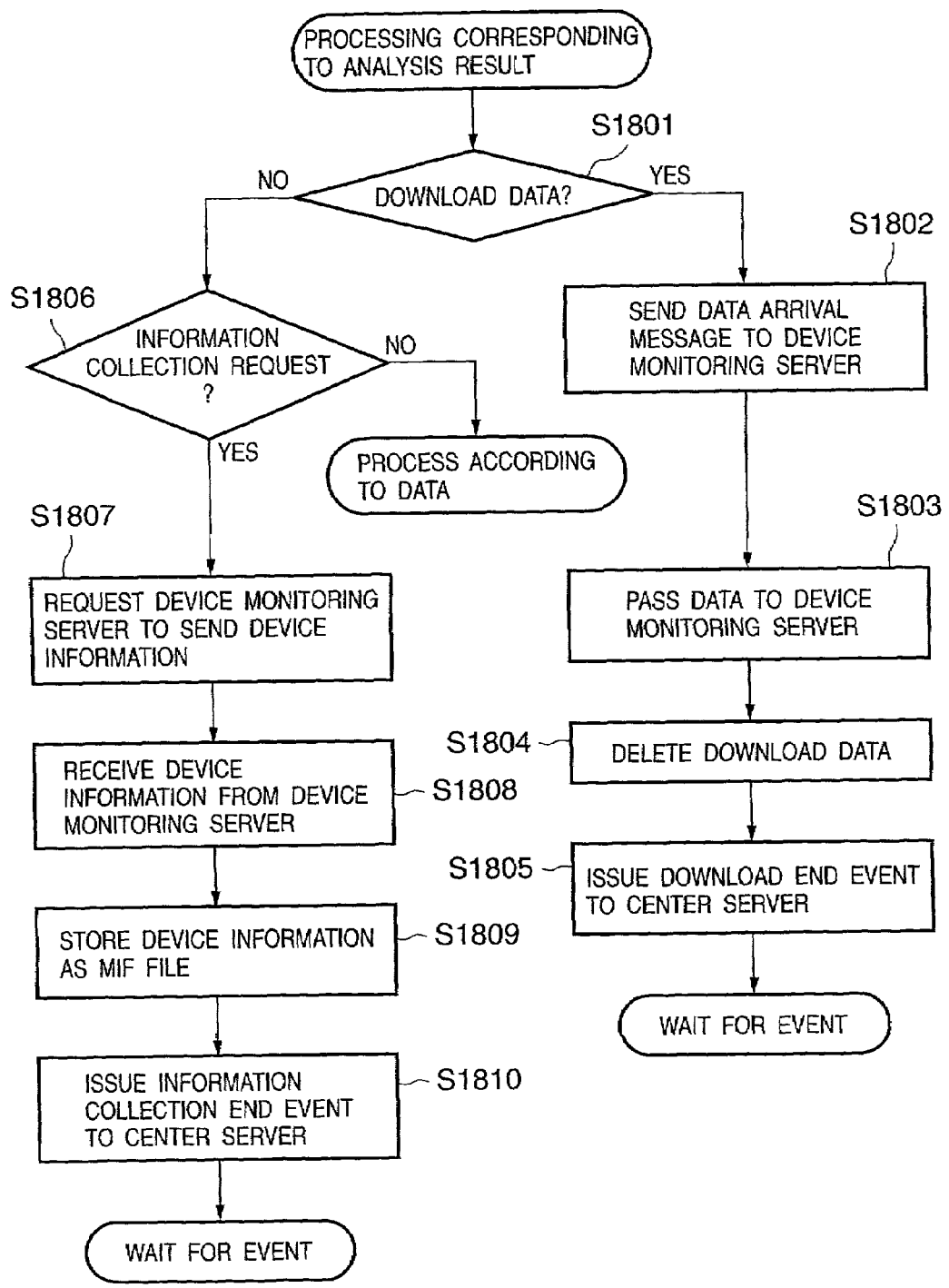
FIG. 18 is a flow chart showing the sequence of processing done by the local plugin 203b in accordance with a message received from a center server 1101.

If the message source is not the device monitoring server 203a, it is determined that the message comes from the center server 110. Then, the contents of the predetermined area written by the PC monitoring client 203d are read out (step S1708), and the readout data is analyzed to execute a process corresponding to its contents. FIG. 18 shows details of the process corresponding to the analyzed contents.

FIG. 18 is a flow chart showing the sequence of the processing done by the local plugin 203b in accordance with a message received from the center server 1101.

It is checked if the received message is download data (step S1801). If YES in step S1801, a download data reception message is sent to the device monitoring server 203a (step S1802), and the received data is passed to the server 203a (step S1803). The passed data is deleted (step S1804), and a download completion event is issued to the center server (step S1805).

If the message is not download data, it is checked if the message is a device information collection request (step S1806). If YES in step S1806, a device information collection request is issued to the device monitoring server 203a (step S1807).

Upon receiving device information from the device monitoring server 203a in response to that request (step S1808), the received information is stored as an MIF file (step S1809), and a device information collection message is issued to the center server 110.

<Processing Sequence by PC Monitoring Client>

Figure 19:
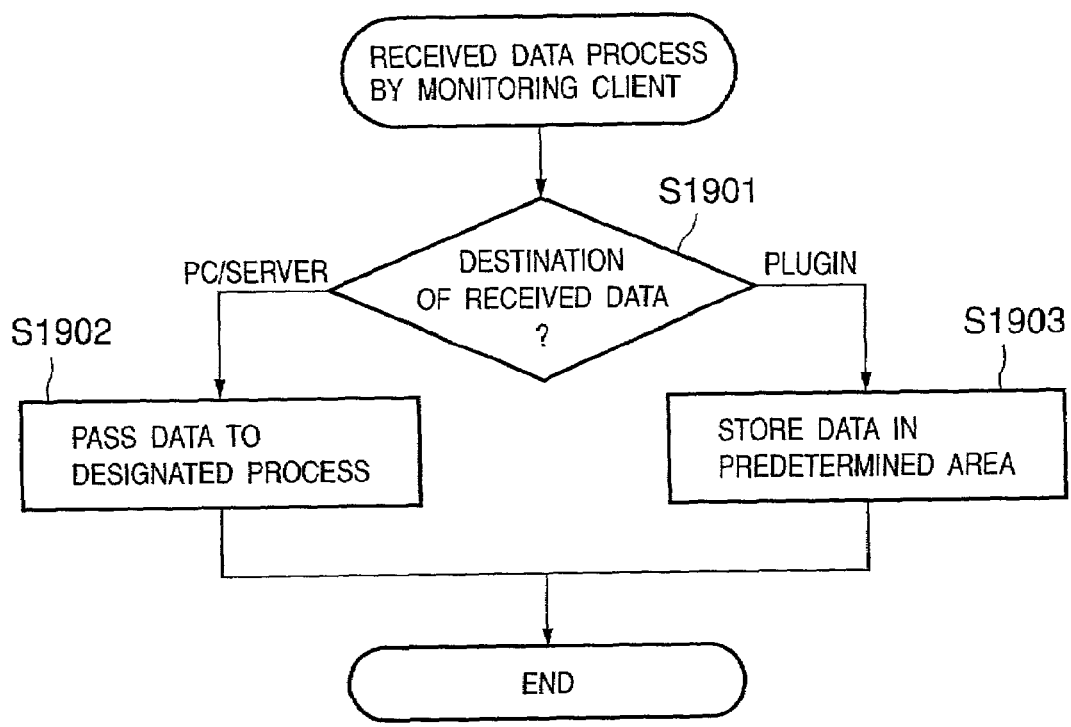
FIG. 19 is a flow chart showing the processing sequence of a PC monitoring client upon receiving a message.

FIG. 19 is a flow chart showing the processing sequence of the PC monitoring client upon receiving a message.

Referring to FIG. 19, the destination of the received data is checked (step S1901). If the data is addressed to a versatile computer such as a PC/server, the received data is passed to the designated process (step S1902); if the data is addressed to the local plugin, the data is written in the aforementioned predetermined area.

As described above, in the system of this embodiment, peripheral devices equipped in the user site where versatile computers to be monitored are also equipped can be managed using the monitoring system for versatile computers. In this way, the supervisor site can integrally monitor versatile computers and peripheral devices by the same method. Furthermore, collection of information, parameter setup, and the like that pertain to peripheral devices can be done from the supervisor site side via the monitoring system. Also, the user site can send a log to the supervisor site.

Moreover, since all modules to be appended to the versatile computer monitoring system to manage peripheral devices can be implemented by software, no dedicated hardware is required, and an increase in hardware scale such as an installation area, device cost, maintenance work, and the like can be prevented.

The present invention is not limited to a system for making management information of the device system compatible to the management software of the versatile computers (PC/server system), but may be applied to a system for making management information of the PC/server system compatible to the management software of the peripheral devices (device system). For example, the device system 201 and PC/server system 202, and the device monitoring server 203a and PC monitoring client module 203d in FIG. 9 are replaced each other, the MIF file 203e is replaced by a file format unique to a device, the local plugin 203b is provided with a function of converting the PC/server-system format into the device-system format, the center server executes processes for the device system, and the device information processing module 901 processes information of the PC/server system to issue an event to the device center.

Another Embodiment

Note that the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

Device information data may be held in internal HDDs of an image processing apparatus and image data rasterizing apparatus, an externally connected storage medium, a server that the image data rasterizing apparatus can access, and the like. Furthermore, device information data which is arbitrarily set by the user may be used.

As the storage medium for supplying the program code, for example, a floppy disk, hard disk, optical disk, magneto-optical disk, CD-ROM, CD-R, DVD-ROM, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores program codes corresponding to the aforementioned flow charts (shown in FIGS. 5 to 7 and FIGS. 13 to 19).

To restate, according to the present invention, apparatuses such as peripheral devices, versatile computers, and the like equipped in the user site can be integrally managed.

Also, according to the present invention, both versatile computers and peripheral devices at a remote site can be integrally managed on the supervisor side.

Furthermore, according to the present invention, upon integrally managing versatile computers and peripheral devices, information unique to each peripheral device, i.e., detailed information of the peripheral device can also be managed.

Moreover, according to the present invention, a remote site management system which integrally manages versatile computers and peripheral devices, and can be developed efficiently can be provided.

In addition, according to the present invention, a communication line of both versatile computers and peripheral devices can also be integrated.

Further, according to the present invention, versatile computers and peripheral devices can be integrally managed even on the user side.

As many apparently widely different embodiments of the present invention can be made without departing from the spirit and scope thereof, it is to be understood that the invention is not limited to the specific embodiments thereof except as defined in the appended claims.

What is claimed is:

1. A server system, comprising:
a first center server that communicates with a first local server and executes a printing device management software; and
a second center server that executes a general purpose computer management software and acquires information regarding a general purpose computer from a second local server, the second center server being prepared separately from said first center server,
wherein the first local server (i) collects device information including first device information and second device information from a printing device, wherein the collected device information is unique to the printing device and the first device information of the collected device information is not to be sent to the first center server, (ii) judges whether or not the collected device information includes the second device information which is to be sent to the first center server, and (iii) sends the second device information to the first center server in a first format for the printing device management software, the second device information including a counter value which indicates a number of pages printed by the printing device and information which indicates a trouble event, and
wherein said first center server comprises:
an acquisition unit that acquires the second device information from the first local server in the first format via the network;
a determination unit that determines whether or not the second device information acquired by the acquisition unit indicates the trouble event and if so, selects the second device information indicating the trouble event;
a format convener that converts the second device information selected by the determination unit into a second format that can be interpreted by said second center server; and
a transmitter that transmits the converted second device information that indicates the trouble event to the second center server, without transmitting the second device information that indicates the counter value to the second center server.

2. The system according to claim 1, wherein said second center server further comprises a display controller that causes a display to identifiably display the information regarding the general purpose computer which is acquired from said second local server, and the second device information converted by said format converter.

3. The system according to claim 2, wherein said display controller causes the display to display the second device information and the information regarding the general purpose computer in chronological order in a list, and
said display controller causes the display to display information regarding the printing device in addition to the list.

4. The system according to claim 1, wherein the first device information includes information which indicates an error has occurred that can be recovered by resetting using a power ON/OFF function of the device.

5. A method of managing a server system comprising a first center server that communicates with a first local server and executes a printing device management software and a second center server that executes a general purpose computer management software and acquires information regarding a general purpose computer from a second local server, the second center server being prepared separately from said first center server, the method comprising:

executing the printing device management software in the first center server by communicating with the first local server;

executing the general purpose computer management software in the second center server and acquiring, by the second center server, information regarding a general purpose computer from the second local server;

executing by the first local server the steps of (i) collecting device information including first device information and second device information from a printing device, wherein the collected device information is unique to the printing device and the first device information of the collected device information is not to be sent to the first center server, (ii) judging whether or not the collected device information includes the second device information which is to be sent to the first center server, and (iii) sending the second device information to the first center server in a first format for the printing device management software, the second device information including a counter value which indicates a number of pages printed by the printing device and information which indicates a trouble event; and the first center server executing the steps of:

an acquiring step of acquiring the second device information from the first local server in the first format via the network;

a determining step of determining whether or not the acquired second device information indicates the trouble event and if so, selecting the second device information indicating the trouble event;

a format convening step of converting the second device information selected by the determining step into a second format that can be interpreted by said second center server; and a transmitting step of transmitting the converted second device information that indicates the trouble event to the second center server, without transmitting the second device information that indicates the counter value to the second center server.

6. The method according to claim 5, further comprising a display controlling step of causing a display of the second center server to identifiably display the information regarding the general purpose computer which is acquired from the second local server and the second information of the printing device converted in said format converting step.

7. The method according to claim 6, wherein said display controlling step causes the display to display the information of the printing device and the information regarding the general purpose computer in chronological order in a list, and said display controlling step causes the display to display information regarding the printing device in addition to the list.

* * * * *